United States Patent
Sridhara et al.

(10) Patent No.: US 11,115,885 B2
(45) Date of Patent: Sep. 7, 2021

(54) AUDIO SYNCHRONIZATION DURING HANDOVER

(71) Applicant: QUALCOMM Incorporated, San Diego, CA (US)

(72) Inventors: Srivathsa Sridhara, Bhadravathi (IN); Dishant Srivastava, Bangalore (IN); Ravi Shekhar, Thubarahalli (IN)

(73) Assignee: QUALCOMM INCORPORATED, San Diego, CA (US)

( * ) Notice: Subject to any disclaimer, the term of this patent is extended or adjusted under 35 U.S.C. 154(b) by 21 days.

(21) Appl. No.: 16/389,335

(22) Filed: Apr. 19, 2019

(65) Prior Publication Data

US 2020/0336958 A1 Oct. 22, 2020

(51) Int. Cl.
*H04W 36/02* (2009.01)
*H04W 36/08* (2009.01)
*G10L 19/16* (2013.01)
*H04W 36/18* (2009.01)

(52) U.S. Cl.
CPC .......... *H04W 36/02* (2013.01); *G10L 19/167* (2013.01); *H04W 36/08* (2013.01); *H04W 36/18* (2013.01)

(58) Field of Classification Search
CPC ...... G11B 27/10; H04R 2420/07; H04R 3/00; H04R 3/12
See application file for complete search history.

(56) References Cited

U.S. PATENT DOCUMENTS

| | | | | |
|---|---|---|---|---|
| 10,159,105 B1* | 12/2018 | Linsky | ............. | H04W 4/80 |
| 10,516,934 B1* | 12/2019 | Solbach | ............. | G10L 21/0232 |
| 2005/0037823 A1* | 2/2005 | Seshadri | ............. | H04M 1/6066 |
| | | | | 455/575.6 |
| 2006/0013130 A1* | 1/2006 | Bloebaum | ............. | H04L 1/0009 |
| | | | | 370/229 |
| 2006/0194538 A1* | 8/2006 | Palin | ............. | H04M 1/733 |
| | | | | 455/41.2 |
| 2006/0194600 A1* | 8/2006 | Palin | ............. | H04W 16/14 |
| | | | | 455/512 |
| 2006/0205401 A1* | 9/2006 | Palin | ............. | H04M 1/6066 |
| | | | | 455/425 |
| 2006/0270347 A1* | 11/2006 | Ibrahim | ............. | H04H 20/08 |
| | | | | 455/41.2 |
| 2008/0103776 A1* | 5/2008 | Kumar | ............. | H04M 1/6066 |
| | | | | 704/270 |
| 2008/0144645 A1* | 6/2008 | Russell | ............. | H04L 49/90 |
| | | | | 370/412 |

(Continued)

*Primary Examiner* — Parth Patel
*Assistant Examiner* — Berhanu D Belete
(74) *Attorney, Agent, or Firm* — Holland & Hart LLP

(57) ABSTRACT

Methods, systems, and devices for wireless communications are described. Generally, the described techniques provide for initiating, at a first wireless audio device, a handover interval including one or more extended synchronous connection-oriented (eSCO) windows, buffering a set of one or more audio (e.g., microphone) data packets during the handover interval, discarding at least a portion of the set of one or more audio data packets during the handover interval, receiving a handover indication from a second wireless audio device during an extended retransmission portion of a first eSCO window of the handover interval, and transmitting one or more audio data packets during a second eSCO window that is subsequent to the handover interval.

18 Claims, 14 Drawing Sheets

(56) References Cited

U.S. PATENT DOCUMENTS

| | | | | |
|---|---|---|---|---|
| 2008/0287063 | A1* | 11/2008 | Kidron | G10L 19/167 |
| | | | | 455/41.2 |
| 2010/0029325 | A1* | 2/2010 | Wang | H04W 72/1215 |
| | | | | 455/553.1 |
| 2011/0097998 | A1* | 4/2011 | Ko | H04W 72/1215 |
| | | | | 455/41.2 |
| 2012/0230510 | A1* | 9/2012 | Dinescu | H04R 5/033 |
| | | | | 381/80 |
| 2014/0099896 | A1* | 4/2014 | Ko | H04W 72/04 |
| | | | | 455/41.2 |
| 2014/0341108 | A1* | 11/2014 | Desai | H04W 72/082 |
| | | | | 370/328 |
| 2015/0105122 | A1* | 4/2015 | Wei | H04J 11/0023 |
| | | | | 455/553.1 |
| 2015/0181010 | A1* | 6/2015 | Bran | H04M 1/6066 |
| | | | | 455/557 |
| 2015/0296468 | A1* | 10/2015 | Dural | H04W 56/003 |
| | | | | 370/336 |
| 2015/0319557 | A1* | 11/2015 | El-Hoiydi | H04L 1/08 |
| | | | | 455/41.2 |
| 2016/0050679 | A1* | 2/2016 | Desai | H04L 5/0073 |
| | | | | 375/132 |
| 2016/0119797 | A1* | 4/2016 | Das | H04W 4/80 |
| | | | | 370/252 |
| 2016/0191181 | A1* | 6/2016 | Bailey | H04R 3/12 |
| | | | | 381/77 |
| 2019/0045304 | A1* | 2/2019 | Bhalla | H04R 3/00 |
| 2020/0059504 | A1* | 2/2020 | Ho | H04L 65/60 |
| 2020/0100018 | A1* | 3/2020 | Solbach | H04R 1/1083 |
| 2020/0162205 | A1* | 5/2020 | Han | H04L 1/1825 |
| 2020/0221359 | A1* | 7/2020 | Srivastava | H04W 76/23 |

* cited by examiner

AUDIO SYNCHRONIZATION DURING HANDOVER

BACKGROUND

The following relates generally to wireless communications, and more specifically to audio synchronization during handover. In some examples, a host device may communicate with a primary wireless audio device (e.g., a wireless earbud) via a wireless communication link. A secondary wireless audio device may shadow the wireless communication link, and may perform sniffing procedures on the wireless communication link. In some examples (e.g., during a voice call), the first wireless audio device and the second wireless audio device may perform a handover procedure (e.g., the primary wireless ear bud may assume the role of secondary earbud and the secondary wireless earbud may assume the role of the primary earbud). The handover procedure may take a variable amount of time to complete. It may be difficult to synchronize the Bluetooth controller and its host for handover at a particular point with respect to audio data. For instance, it may take an amount of time to buffer data packets at the new primary wireless audio device, and the new primary wireless audio device may therefore not be able to transmit microphone data to the host device immediately upon assuming the role of primary wireless audio device. This delay may introduce a noticeable glitch in the voice data for the user.

SUMMARY

The described techniques relate to improved methods, systems, devices, and apparatuses that support audio synchronization during handover. Generally, the described techniques provide for initiating, at a first wireless audio device, a handover interval including one or more extended synchronous connection-oriented (eSCO) windows, buffering a set of one or more audio (e.g., microphone) data packets during the handover interval, discarding at least a portion of the set of one or more microphone data packets during the handover interval, receiving a handover indication from a second wireless audio device during an extended retransmission portion of a first eSCO window of the handover interval, and transmitting one or more microphone data packets during a second eSCO window that is subsequent to the handover interval.

A method of wireless communications at a first wireless audio device is described. The method may include initiating a handover interval including one or more eSCO windows, buffering a set of one or more audio data packets during the handover interval, discarding at least a portion of the set of one or more audio data packets during the handover interval, receiving, during an extended retransmission portion of a first eSCO window of the handover interval, a handover indication from a second wireless audio device, and transmitting, to a host device based on the handover indication, one or more audio data packets during a second eSCO window that is subsequent to the handover interval.

An apparatus for wireless communications at a first wireless audio device is described. The apparatus may include a processor, memory in electronic communication with the processor, and instructions stored in the memory. The instructions may be executable by the processor to cause the apparatus to initiate a handover interval including one or more eSCO windows, buffer a set of one or more audio data packets during the handover interval, discard at least a portion of the set of one or more audio data packets during the handover interval, receive, during an extended retransmission portion of a first eSCO window of the handover interval, a handover indication from a second wireless audio device, and transmit, to a host device based on the handover indication, one or more audio data packets during a second eSCO window that is subsequent to the handover interval.

Another apparatus for wireless communications at a first wireless audio device is described. The apparatus may include means for initiating a handover interval including one or more eSCO windows, buffering a set of one or more audio data packets during the handover interval, discarding at least a portion of the set of one or more audio data packets during the handover interval, receiving, during an extended retransmission portion of a first eSCO window of the handover interval, a handover indication from a second wireless audio device, and transmitting, to a host device based on the handover indication, one or more audio data packets during a second eSCO window that is subsequent to the handover interval.

A non-transitory computer-readable medium storing code for wireless communications at a first wireless audio device is described. The code may include instructions executable by a processor to initiate a handover interval including one or more eSCO windows, buffer a set of one or more audio data packets during the handover interval, discard at least a portion of the set of one or more audio data packets during the handover interval, receive, during an extended retransmission portion of a first eSCO window of the handover interval, a handover indication from a second wireless audio device, and transmit, to a host device based on the handover indication, one or more audio data packets during a second eSCO window that is subsequent to the handover interval.

Some examples of the method, apparatuses, and non-transitory computer-readable medium described herein may further include operations, features, means, or instructions for transmitting, based on receiving the handover indication, a handover indication response to the second wireless audio device during the extended retransmission portion of the first eSCO window, where transmitting the one or more audio data packets during the second eSCO window may be based on the handover indication response.

Some examples of the method, apparatuses, and non-transitory computer-readable medium described herein may further include operations, features, means, or instructions for enabling microphone data for the first wireless audio device, based on initiating the handover interval, where buffering the set of one or more audio data packets may be based on enabling the microphone data.

In some examples of the method, apparatuses, and non-transitory computer-readable medium described herein, initiating the handover interval further may include operations, features, means, or instructions for communicating with the second wireless audio device, and identifying, based on the communicating, a link quality between the second wireless audio device and the host device; where initiating the handover interval may be based on the identified link quality.

In some examples of the method, apparatuses, and non-transitory computer-readable medium described herein, the communicating may be performed over an eSCO link between the first wireless audio device and the second wireless audio device.

Some examples of the method, apparatuses, and non-transitory computer-readable medium described herein may further include operations, features, means, or instructions for timestamping, by an audio synchronization system of the first wireless audio device, each of the buffered set of one or more audio data packets, identifying, based on the handover indication, a timestamp for a last microphone data packet transmitted by the second wireless audio device to the host device, and determining, based on the timestamping, whether one or more of the buffered set of one or more audio data packets may be older than the timestamp for the last microphone data packet transmitted by the second wireless audio device to the host device plus a maximum system latency.

Some examples of the method, apparatuses, and non-transitory computer-readable medium described herein may further include operations, features, means, or instructions for discarding the one or more of the buffered set of one or more audio data packets, upon determining that one or more of the buffered set of one or more audio data packets may be older than the timestamp for the last microphone data packet transmitted by the second wireless audio device to the host device plus a maximum system latency.

Some examples of the method, apparatuses, and non-transitory computer-readable medium described herein may further include operations, features, means, or instructions for monitoring, based on initiating the handover interval, for the handover indication during the extended retransmission portion of the first eSCO window of the handover interval, where receiving the handover indication may be based on the monitoring.

Some examples of the method, apparatuses, and non-transitory computer-readable medium described herein may further include operations, features, means, or instructions for reverting to a default eSCO window duration that does not include an extended retransmission portion upon terminating the handover interval, where the default eSCO window duration may be shorter than a duration of the one or more eSCO windows included in the handover interval.

In some examples of the method, apparatuses, and non-transitory computer-readable medium described herein, the second eSCO window may be consecutive to the first eSCO window.

DETAILED DESCRIPTION

Figure 1:
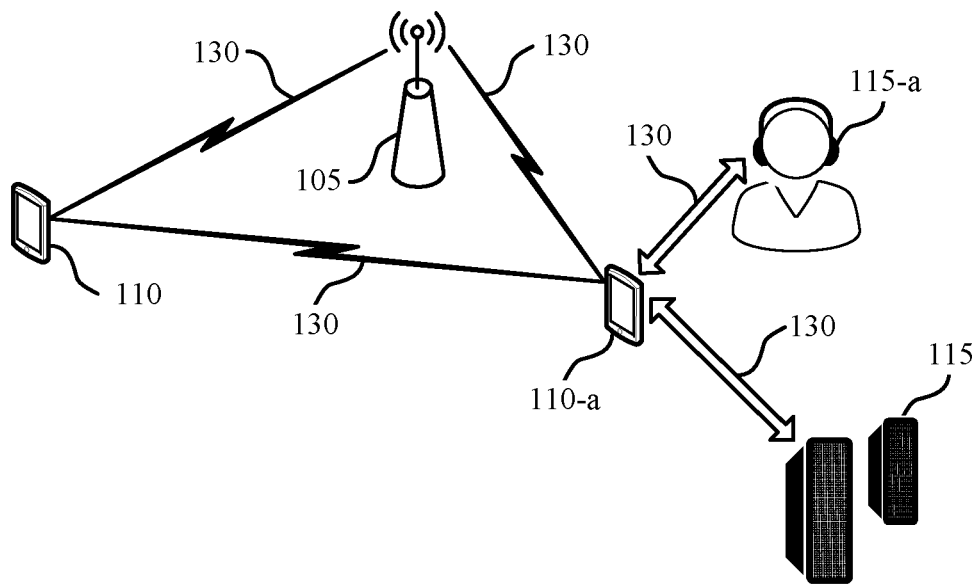
FIG. 1 illustrates an example of a system for wireless communications that supports audio synchronization during handover in accordance with aspects of the present disclosure.

In some examples of a wireless communications system, Bluetooth devices may include, for example, a host device such as a cell phone, smart phone, portable music player, or the like. Such a device may be in communication with one or more wireless audio devices (e.g., true wireless stereo (TWS) Bluetooth earbuds). A wireless audio device, such as a first wireless audio device (e.g., a primary earbud), may be connected to the phone in a primary role, and may pass information (e.g., timing information) to the second wireless device in a secondary role (e.g., a secondary earbud or sniffer bud). The second wireless audio device may sniff voice data between the first wireless audio device and the phone.

In some examples, a first wireless audio device with a primary role may maintain an active link to a host device and a second wireless audio device with a secondary role may shadow the active link to access voice data. The first wireless audio device may switch between the primary role and the secondary role (e.g. a handover procedure) with the second wireless audio device. The second wireless audio device assume the primary role of communicating with the host device over the active link. The first wireless audio device may assume the secondary role and shadow the active link to access voice data. In some examples, TWS shadowing may support the handover procedure.

In some examples, the handover procedure may occur during a voice call. The handover procedure may require an amount of time to complete the role switch between the first wireless audio device and the second wireless audio device. Further, it may be difficult to synchronize the host device with the first wireless audio device and the second wireless audio device at a particular point with respect to audio data in the voice call. In some examples, the host device may enable the microphone on the second wireless audio device upon receiving an indication of the switch between primary and secondary roles. The second wireless audio device may not have the user's voice data to transfer immediately as it assumes the primary role. This delay may cause a blackout of the user's voice data (e.g. glitch) for this period of time during the switch.

In some examples, the first wireless audio device and second wireless audio devices may perform a handover to avoid audio glitches or blackout periods according to techniques described herein. For example, the second wireless audio device may enable the microphone data when the handover procedure is initiated. The second wireless audio device may discard the data packets it receives until the handover procedure is complete. The first wireless audio device may determine to complete the handover procedure and the second wireless audio device may cease to discard the data packets it receives and assume the primary role. The first wireless audio device may cease to receive data packets as it assumes the secondary role. Thus, the wireless audio devices may perform the handover procedure in a way that does not cause a blackout of the user's voice data.

Aspects of the disclosure are initially described in the context of a wireless communications system. Aspects of the disclosure are further illustrated by and described with reference to wireless communications systems, and timelines. Aspects of the disclosure are further illustrated by and described with reference to apparatus diagrams, system diagrams, and flowcharts that relate to audio synchronization during handover.

FIG. 1 illustrates a wireless communication system 100 (e.g., which may include to refer to or include a wireless personal area network (PAN), a wireless local area network (WLAN), a Wi-Fi network) configured in accordance with various aspects of the present disclosure. The wireless communication system 100 may include an AP 105, devices (e.g., host devices 110), and paired devices (e.g., wireless audio devices 115) implementing WLAN communications (e.g., Wi-Fi communications) and/or Bluetooth communications. For example, host devices 110 may include cell phones, mobile stations, personal digital assistant (PDAs), other handheld devices, netbooks, notebook computers, tablet computers, laptops, or some other suitable terminology. Paired devices (e.g., wireless audio devices 115) may include Bluetooth devices capable of pairing with other Bluetooth devices (e.g., such as host devices 110), which may include wireless headsets, wireless audio devices, ear pieces, headphones, display devices (e.g., TVs, computer monitors), microphones, meters, valves, etc.

Bluetooth communications may refer to a short-range communication protocol and may be used to connect and exchange information between host devices 110 and wireless audio devices 115 (e.g., between mobile phones, computers, digital cameras, wireless headsets, wireless audio devices, keyboards, mice or other input peripherals, and similar devices). Bluetooth systems (e.g., aspects of wireless communication system 100) may be organized using a master-slave relationship employing a time division duplex protocol having, for example, defined time slots of 625 mu secs, in which transmission alternates between the master device (e.g., a host device 110) and one or more slave devices (e.g., paired devices such as wireless audio devices 115). In some cases, a host device 110 may generally refer to a master device, and a wireless audio device 115 may refer to a slave device in a PAN. As such, in some cases, a device may be referred to as either a host device 110 or a wireless audio device 115 based on the Bluetooth role configuration of the device. That is, designation of a device as either a host device 110 or a wireless audio device 115 may not necessarily indicate a distinction in device capability, but rather may refer to or indicate roles held by the device in the PAN. Generally, host device 110 may refer to a wireless communication device capable of wirelessly exchanging data signals with another device, and wireless audio device 115 may refer to a device operating in a slave role, or to a short-range wireless device capable of exchanging data signals with the mobile device (e.g., using Bluetooth communication protocols).

A Bluetooth device may be compatible with certain Bluetooth profiles to use desired services. A Bluetooth profile may refer to a specification regarding an aspect of Bluetooth-based wireless communications between devices. That is, a profile specification may refer to a set of instructions for using the Bluetooth protocol stack in a certain way, and may include information such as suggested user interface formats, particular options and parameters at each layer of the Bluetooth protocol stack, etc. For example, a Bluetooth specification may include various profiles that define the behavior associated with each communication endpoint to implement a specific use case. Profiles may thus generally be defined according to a protocol stack that promotes and allows interoperability between endpoint devices from different manufacturers through enabling applications to discover and use services that other nearby Bluetooth devices may be offering. The Bluetooth specification defines device role pairs that together form a single use case called a profile. One example profile defined in the Bluetooth specification is the Handsfree Profile (HFP) for voice telephony, in which one device implements an Audio Gateway (AG) role and the other device implements a Handsfree (HF) device role. Another example is the Advanced Audio Distribution Profile (A2DP) for high-quality audio streaming, in which one device (e.g., host device 110-a) implements an audio host device (SRC) role and another device (e.g., wireless audio device 115) implements an audio sink device (SNK) role.

For a commercial Bluetooth device that implements one role in a profile to function properly, another device that implements the corresponding role must be present within the radio range of the first device. For example, in order for an HF device such as a Bluetooth headset to function according to the Handsfree Profile, a device implementing the AG role (e.g., a cell phone) must be present within radio range. Likewise, in order to stream high-quality mono or stereo audio according to the A2DP, a device implementing the SNK role (e.g., Bluetooth headphones or Bluetooth wireless audio devices) must be within radio range of a device implementing the SRC role (e.g., a stereo music player).

The Bluetooth specification defines a layered data transport architecture and various protocols and procedures to handle data communicated between two devices that implement a particular profile use case. For example, various logical links are available to support different application data transport requirements, with each logical link associated with a logical transport having certain characteristics (e.g., flow control, acknowledgement/repeat mechanisms, sequence numbering, scheduling behavior, etc.). The Bluetooth protocol stack is split in two parts: a "controller stack" containing the timing critical radio interface, and a "host stack" dealing with high level data. The controller stack is generally implemented in a low-cost silicon device containing the Bluetooth radio and a microprocessor. The controller stack may be responsible for setting up communication links 130 such as asynchronous connection-less (ACL) links, synchronous connection orientated (SCO) links, etc. Further, the controller stack may implement link management protocol (LMP) functions, low energy link layer (LE LL) functions, etc. The host stack is generally implemented as part of an operating system, or as an installable package on top of an operating system. The host stack may be responsible for logical link control and adaptation protocol (L2CAP) functions, Bluetooth network encapsulation protocol (BNEP) functions, service discovery protocol (SDP) functions, etc. In some cases, the controller stack and the host stack may communicate via a host controller interface (HCI). In other cases, (e.g., for integrated devices such as Bluetooth headsets), the host stack and controller stack may be run on the same microprocessor to reduce mass production costs. For such "hostless systems," the HCI may be optional, and may be implemented as an internal software interface.

A communication link 130 established between two Bluetooth devices (e.g., between a host device 110-a and a wireless audio device 115-a) may provide for communications or services (e.g., according to some Bluetooth profile). For example, a Bluetooth connection may be an extended synchronous connection orientated (eSCO) link for voice call (e.g., which may allow for retransmission), an ACL link for music streaming (e.g., A2DP), etc. For example, eSCO packets may be transmitted in predetermined time slots (e.g., 6 Bluetooth slots each for eSCO). The regular interval between the eSCO packets may be specified when the Bluetooth link is established. The eSCO packets to/from a specific slave device (e.g., wireless audio device 115-a) are acknowledged, and may be retransmitted if not acknowledged during a retransmission window. In addition, audio may be streamed between the host device 110-a and wireless audio device 115-a using an ACL link (A2DP profile). In some cases, the ACL link may occupy 1, 3, or 5 Bluetooth slots for data or voice. Other Bluetooth profiles supported by Bluetooth devices may include Bluetooth Low Energy (BLE) (e.g., providing considerably reduced power consumption and cost while maintaining a similar communication range), human interface device profile (HID) (e.g., providing low latency links with low power requirements), etc.

In some cases, a device may be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some cases, Bluetooth and WLAN communications may share a same medium, such as the same unlicensed frequency medium. In such cases, a host device 110 may support WLAN communications via AP 105, which may include communicating over communication links 130 (e.g., WLAN communication links). The AP 105 and the associated host devices 110 may represent a basic service set (BSS) or an extended service set (ESS). The various host devices 110 in the network may be able to communicate with one another through the AP 105. In some cases, the AP 105 may be associated with a coverage area, which may represent a basic service area (BSA).

Host devices 110 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within wireless communication system 100, and devices may communicate with each other via communication links 130 (e.g., peer-to-peer communication links). AP 105 may be coupled to a network, such as the Internet, and may enable a host device 110 to communicate via the network (or communicate with other host devices 110 coupled to the AP 105). A host device 110 may communicate with a network device bi-directionally. For example, in a WLAN, a host device 110 may communicate with an associated AP 105 via downlink (e.g., the communication link from the AP 105 to the host device 110) and uplink (e.g., the communication link from the host device 110 to the AP 105).

In some examples, content, media, audio, etc. exchanged between a host device 110 and a wireless audio device 115 may originate from a WLAN. For example, in some cases, host device 110-a may receive audio from an AP 105 (e.g., via WLAN communications), and the host device 110-a may then implement the described techniques to relay or pass the audio to the wireless audio device 115-a (e.g., via Bluetooth communications). In some cases, certain types of Bluetooth communications (e.g., such as high quality or high definition (HD) Bluetooth) may require enhanced quality of service. For example, in some cases, delay-sensitive Bluetooth traffic may have higher priority than WLAN traffic.

In some examples, as described in greater detail with respect to FIGS. 2A and 2B, a host device 110-a may be referred to as a host device 110-a, and a wireless audio device 115-a may be referred to as a primary wireless audio device or a secondary wireless audio device. That is, a primary wireless audio device 115-a may be in direct communication with a host device 110-a, and a secondary wireless audio device 115-a may sniff communications between host device 110-a and primary wireless audio device 115-a.

In some examples, a wireless audio device 115-a may initiate, at a first wireless audio device, a handover interval including one or more extended synchronous connection-oriented (eSCO) windows, buffer a set of one or more audio (e.g., microphone) data packets during the handover interval, discard at least a portion of the set of one or more microphone data packets during the handover interval, receive a handover indication from a second wireless audio device 115 during an extended retransmission portion of a first eSCO window of the handover interval, and transmit one or more microphone data packets during a second eSCO window that is subsequent to the handover interval.

Figure 2:
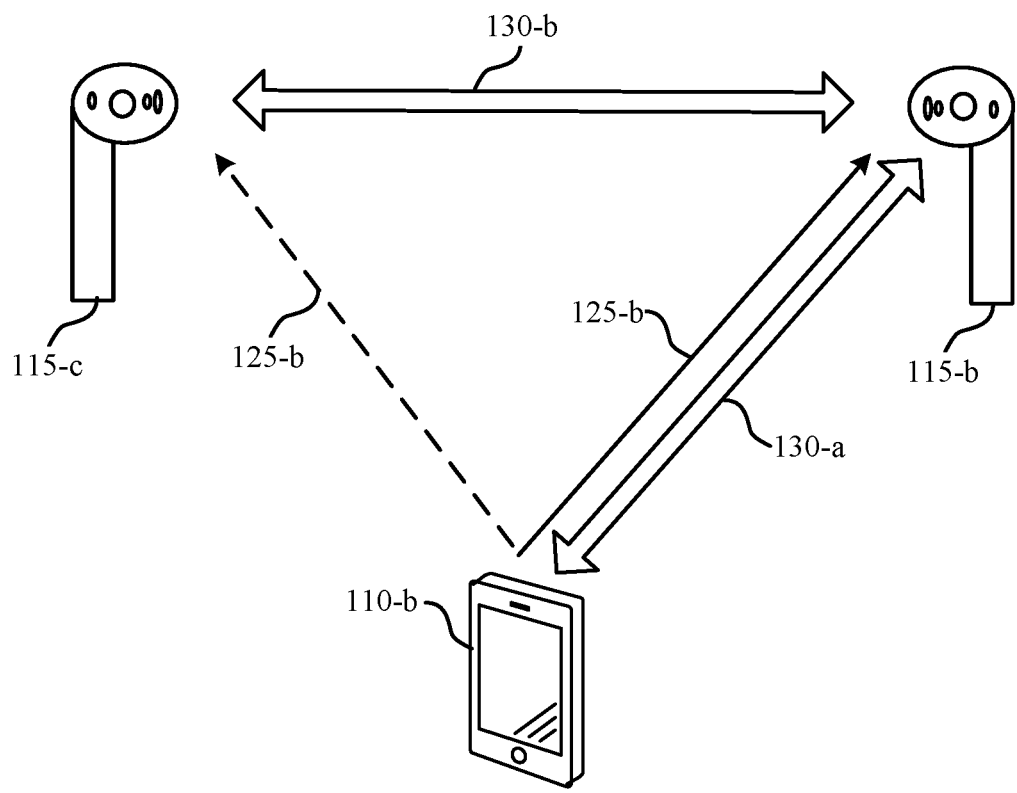
FIG. 2 illustrates an example of a wireless communications system that supports audio synchronization during handover in accordance with aspects of the present disclosure.

FIG. 2 illustrates an example of a wireless communications system 200 with a first topology including a wireless host device 110-b. Wireless host device 110-b may be, for example, a smart phone, a portable music playing device, or the like. Wireless host device 110-b may be in communication via bidirectional primary communication link 121 with one or more wireless audio devices 115, such as first wireless audio device 115-a or second wireless audio device 115-b. Bidirectional primary communication link 121 may include, for example, control information. In some examples, wireless host device 110-b may transmit data (e.g., voice data) to first wireless audio device 115-a. Wireless host device 110-b may transmit voice data 125 over a separate voice link.

In some examples, first wireless audio device 115-a may establish a communication link 130-a (e.g., a control link) with second wireless audio device 115-b. First wireless audio device 115-a may also transmit voice data 125 to second wireless audio device 115-b on a separate voice link.

In some examples, wireless host device 110-b may communicate with first wireless audio device 115-a via a bidirectional primary communication link 121. Wireless host device 110-b may transmit voice data 125 to first wireless audio device 115-a. In some examples, first wireless audio device 115-a may establish a communication link 130-a (e.g., a control link) with second wireless audio device 115-b. First wireless audio device 115-a and second wireless audio device 115-b may communicate (e.g., perform synchronization procedures) via communication link 130-a.

In some examples, first wireless audio device 115-a may provide second wireless audio device 115-b with information, or may perform connection or synchronization procedures via communication link 130-a. Second wireless audio device 115-b may perform Bluetooth sniffing procedures (e.g., TWS shadowing) based on the information received via communication link 130-*a*, and may receive audio data (e.g., voice data 135) that is sent from wireless host device 110-*b* to first wireless audio device 115-*a*.

In some examples, TWS shadowing may involve first wireless audio device 115-*a* with bidirectional primary communication link 121 (e.g. an active ACL or eSCO link) with wireless host device 110-*b*. Second wireless audio device 115-*b* may shadow the bidirectional primary communication link 121 from wireless host device 110-*b* with relay from first wireless audio device 115-*a*, or may perform sniffing procedures of the air traffic over primary communication link 121. In some examples, TWS shadowing may support handover procedures in which first wireless audio device 115-*a* hands over bidirectional primary communication link 121 to second wireless audio device 115-*b*. That is, upon performing a handover procedure, first wireless audio device 115-*a* (e.g., a primary wireless audio device) may assume the role of a secondary wireless audio device, and second wireless audio device 115-*b* (e.g., a secondary wireless audio device) may assume the role of a primary wireless audio device.

In some examples, the handover procedure may occur during a voice call. User experience may be degraded if the user observes a glitch or disruptions during a handover procedure (e.g., where first wireless audio device 115-*a* and second wireless audio device 115-*b* swap roles). However, the handover procedure may require a variable amount of time to complete as it may involve marshaling of stack states, synchronizing link on secondary, role switch, Bluetooth address swap etc. Further, it may be difficult to synchronize the Bluetooth Controller and its host for a handover procedure at a particular point with respect to audio data. Thus, in some examples, the handover procedure may introduce a noticeable glitch in the user's voice data 125. For example, during the handover procedure, the wireless host device 110-*b* may enable the microphone on the second wireless audio device 115-*b* once the first wireless audio device 115-*a* indicates for the second wireless audio device 115-*b* to take control of bidirectional primary communication link 121. In some examples, due to the latencies involved in enabling microphone data, the second wireless audio device 115-*b* may not have the user's voice data to transfer immediately after first wireless audio device 115-*a* indicates handover procedure is complete. As described in greater detail with respect to FIGS. 3-4, this may cause a blackout of the user's voice data 125 during this time. Techniques described herein with respect to FIGS. 5-7 may provide for seamlessly transferring bidirectional primary communication link 121 from first wireless audio device 115-*a* to the second wireless audio device 115-*b*.

Figure 3:
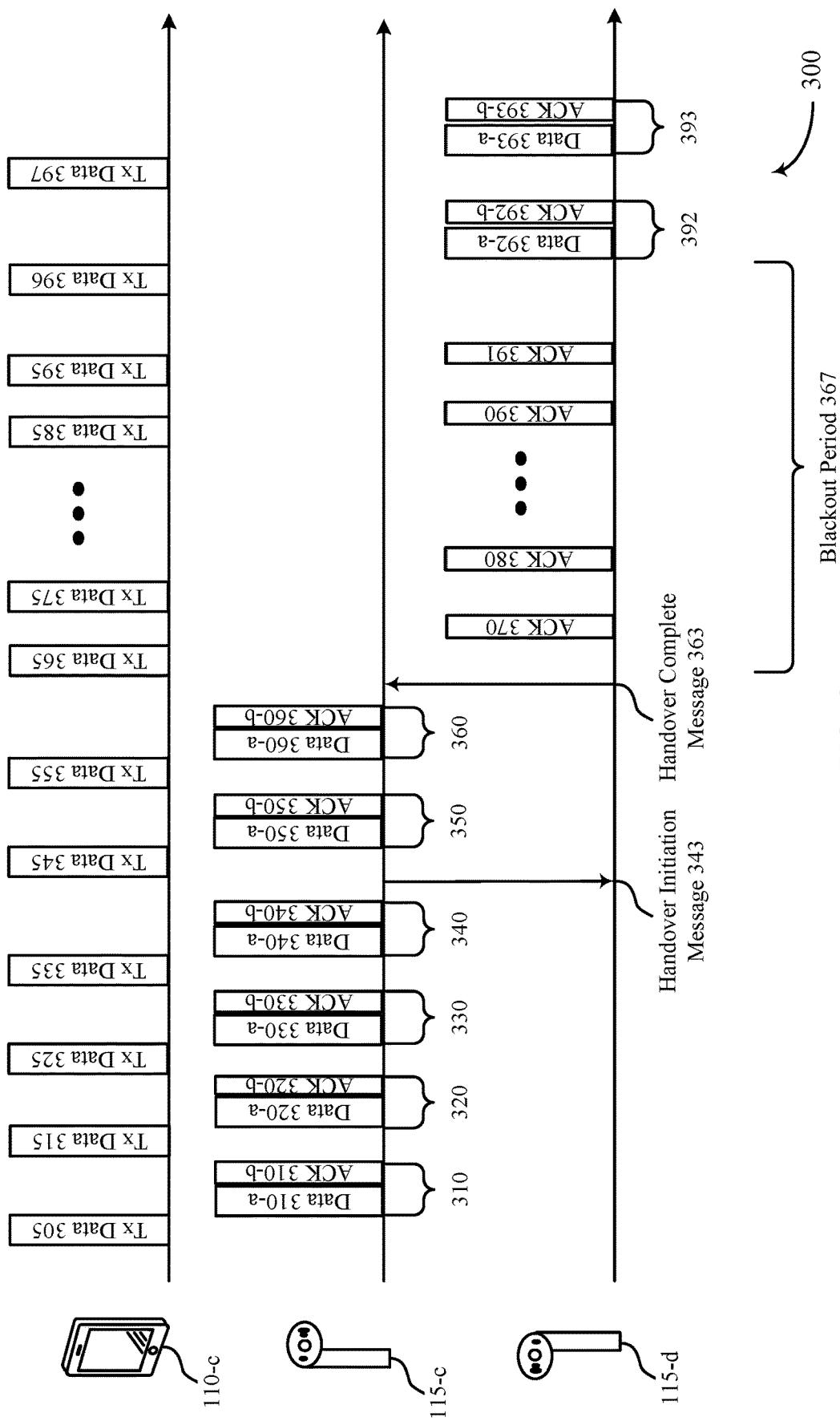
FIG. 3 illustrates an example of a timeline that supports audio synchronization during handover in accordance with aspects of the present disclosure.
Figure 4:
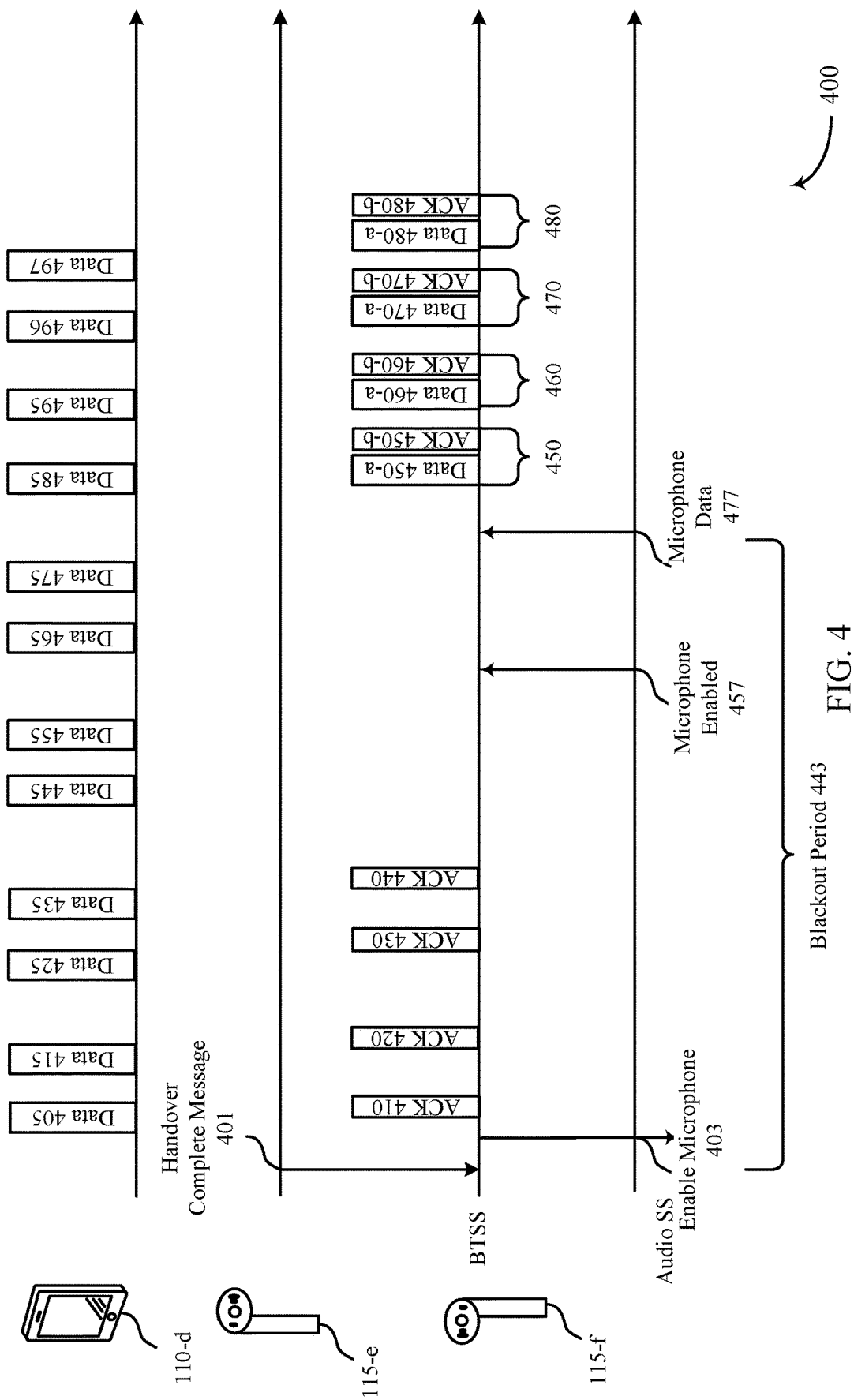
FIG. 4 illustrates an example of a timeline that supports audio synchronization during handover in accordance with aspects of the present disclosure.

In some examples, first wireless audio device 115-*b* and second wireless audio device 115-*c* may perform a handover procedure, as described in greater detail with respect to FIGS. 3 and 4. In some examples, a handover procedure as described herein with respect to FIGS. 6-8 may be implemented to avoid a blackout period after the handover procedure.

FIG. 3 illustrates an example of a timeline 300 that supports audio synchronization during handover in accordance with aspects of the present disclosure. In some examples, timeline 300 may implement aspects of wireless communications system 100 or wireless communications system 200. For example, wireless host device 110-*c*, first wireless audio device 115-*c*, and second wireless audio device 115-*d* may be examples of corresponding devices in wireless communications systems 100 and 200.

In some examples, first wireless audio device 115-*c* may perform the primary wireless audio device role. First wireless audio device 115-*c*, performing the primary wireless audio device role, may use an active communication link with wireless host device 110-*c*. Second wireless audio device 115-*d* may perform the secondary wireless audio device role. Second wireless audio device 115-*d*, performing the secondary wireless audio device role, may perform sniffing procedures to receive data from the active communication link between wireless host device 110-*c* and first wireless audio device 115-*c*.

Prior to a handover procedure, first wireless audio device 115-*c* may perform the role of a primary wireless audio device. Wireless host device 110-*c* may send data 305 to first wireless audio device 115-*c*. First wireless audio device 115-*c* may send transmission 310 including data 310-*a* (e.g. microphone data) and an acknowledgement (ACK) message 310-*b*, indicating that data 305 has been received. Wireless host device 110-*c* may send data 315 to first wireless audio device 115-*c*. First wireless audio device 115-*c* may send transmission 320 including data 320-*a* and an ACK message 320-*b* indicating that data 315 has been received. Wireless host device 110-*c* may send data 325 to first wireless audio device 115-*c*. First wireless audio device 115-*c* may send transmission 330 including data 330-*a* and an ACK message 330-*b* indicating that data 325 has been received. Wireless host device 110-*c* may send data 335 to first wireless audio device 115-*c*. First wireless audio device 115-*c* may send transmission 340 including data 340-*a* and an ACK message 340-*b* indicating that data 335 has been received.

In some examples, first wireless audio device 115-*c* may initiate a handover procedure. For instance, first wireless audio device 115-*c* may send a handover initiation message 343 to second wireless audio device 115-*d*. The handover procedure may require a variable amount of time to complete as it may involve marshaling of stack states, synchronizing link on secondary, role switch, bd address swap etc. Upon completion of the handover procedure, second wireless audio device 115-*d* may signal first wireless audio device 115-*c* that the handover procedure is complete. For instance, second wireless audio device 115-*d* may transmit handover complete message 363 to first wireless audio device 115-*c*. During the time it takes to perform the handover procedure (e.g., the amount of time between receiving handover initiation message 343 and transmitting handover complete message 363), first wireless audio device 115-*c* may continue to perform the primary wireless audio device role. Wireless host device 110-*c* may send data 345 to first wireless audio device 115-*c*. While performing the role of primary wireless audio device, first wireless audio device 115-*c* may send transmission 350 including data 350-*a* (e.g., microphone data) and an ACK message 350-*b* indicating that data 345 has been received. Wireless host device 110-*c* may send data 355 to first wireless audio device 115-*c*. First wireless audio device 115-*c* may send transmission 360 including data 360-*a* and an ACK message 360-*b* indicating that data 355 has been received.

In some examples, a blackout period may occur after the handover procedure is complete. Second wireless audio device 115-*d* may send a signal to first wireless audio device 115-*d* indicating that the handover procedure is complete, as shown in greater detail with respect to FIG. 4. For instance, second wireless audio device 115-*d* may transmit a handover complete message 363 to first wireless audio device 115-*d*. Upon receiving handover complete message 363, second wireless audio device 115-*d* may assume and perform the primary wireless audio device role. That is, second wireless audio device 115-*d* may take over the active communication link with wireless host device 110-*c*. First wireless audio device 115-*c* may assume and perform the secondary wireless audio device role, and may perform sniffing procedures to receive data from the active communication link between wireless host device 110-*c* and second wireless audio device 115-*d*. First wireless audio device 115-*c* and second wireless audio device 115-*d* may perform the role switch soon after or immediately after transmitting handover complete message 363, and second wireless audio device 115-*d* may not have had sufficient time to buffer data (e.g., microphone data) for transmission to host device 110-*c*. Thus, after transmitting handover complete message 363, second wireless audio device 115-*d* may not be able to transmit microphone data for the amount of time it takes to buffer the microphone data. That is, second wireless audio device 115-*d* may send ACK messages without microphone data. A blackout may occur in the user's audio data until second wireless audio device 115-*d* enables the microphone data. This amount of time may last until microphone data can be buffered at the audio synchronization signal module of second wireless audio device 115-*d* and received by a base transceiver synchronization signal module of second wireless audio device 115-*d*.

In some cases, the user may experience a blackout period 367 which lasts from receiving handover complete message 363 to the time at which the microphone data is ready. During the blackout period 367 second wireless audio device 115-*d* may perform the primary wireless audio device role, but may not be able to transmit microphone data. Wireless host device 110-*c* may send data 365 to second wireless audio device 115-*d*. Second wireless audio device 115-*d* may send an ACK message 370 indicating that data 365 has been received. However, as described above, second wireless audio device 115-*d* may not send microphone data along with ACK message 370. Wireless host device 110-*c* may send data 375 to second wireless audio device 115-*d*. Second wireless audio device 115-*d* may send an ACK message 380 indicating that data 375 has been received. Wireless host device 110-*c* may send data 385 to second wireless audio device 115-*d*. Second wireless audio device 115-*d* may send an ACK message 390 indicating that data 385 has been received. Wireless host device 110-*c* may send data 395 to second wireless audio device 115-*d*. Because the blackout period 367 is ongoing, second wireless audio device 115-*d* may send an ACK message 391 (e.g., without any microphone data), indicating that data 395 has been received.

In some cases, second wireless audio device 115-*d* may successfully prepare microphone data for transmission after a sufficient amount of time, ending blackout period 367. Wireless host device 110-*c* may send data 396 to second wireless audio device 115-*d*. Second wireless audio device 115-*d* may send transmission 392 including data 392-*a* and an ACK message 392-*b* indicating that data 396 has been received. Wireless host device 110-*c* may send data 397 to second wireless audio device 115-*d*. Second wireless audio device 115-*d* may send transmission 393 including data 393-*a* and an ACK message 393-*b* indicating that data 397 has been received. First wireless audio device 115-*c* may perform sniffing procedures on the active link between host device 110-*c* and second wireless audio device 115-*d*.

Thus, as described above with respect to FIG. 3, during the blackout period 367, due to the latencies involved in enabling microphone data, second wireless audio device 115-*d* may not be able to transmit microphone data immediately after the handover procedure is complete. A blackout in the user's voice data may occur (e.g., during blackout period 367) while second wireless audio device 115-*d* does not transmit microphone data, as shown in greater detail with respect to FIG. 4. During this duration, second wireless audio device 115-*d* may transmit ACK signals. At the end of blackout period 367, second wireless audio device 115-*d* may begin to send transmissions containing microphone data and ACK messages. In some examples, as described in greater detail with respect to FIGS. 6-8, wireless audio devices may successfully avoid the blackout period 367 after a handover procedure.

FIG. 4 illustrates an example of a timeline 400 that supports audio synchronization during handover in accordance with aspects of the present disclosure. In some examples, timeline 400 may implement aspects of wireless communications system 100, or wireless communications system 200. For example, wireless host device 110-*d*, first wireless audio device 115-*e*, and second wireless audio device 115-*f* may be examples of corresponding devices in wireless communications systems 100 and 200, and timeline 300. FIG. 4 illustrates in greater detail the blackout period described in FIG. 3.

In some examples, a first wireless audio device 115-*e* and a second wireless audio device 115-*f* may perform a role switch. First wireless audio device 115-*e* and second wireless audio device 115-*f* may include a base transceiver synchronization signal (BTSS) module and an audio synchronization signal (SS) module. First wireless audio device 115-*e* may transmit handover complete message 401 to second wireless audio device 115-*f*. First wireless audio device 115-*e* may have been acting in the primary wireless audio device role until the handover procedure is complete. Second wireless audio device 115-*f* may have been acting in the secondary wireless audio device role, but upon receiving the signal that the procedure is complete, may assume and perform the primary wireless audio device role. That is, upon assuming the role of the primary wireless audio device, second wireless audio device 115-*f* may take over the active communication link with wireless host device 110-*d*. First wireless audio device 115-*e* may assume and perform the secondary wireless audio device role, and may perform sniffing procedures to receive data from the active communication link between wireless host device 110-*d* and second wireless audio device 115-*f*. First wireless audio device 115-*e* and second wireless audio device 115-*f* may perform the role switch soon after or immediately after receiving handover complete message 401. However, second wireless audio device 115-*f* may use a minimum amount of time to buffer data (e.g., microphone data, such as audio data picked up by the microphone of second wireless audio device 115-*f*, or audio data reconfiguration, or the like) for transmission to host device 110-*d*. Thus, second wireless audio device 115-*f* may enable microphone data 403 but may not transmit microphone data. That is, second wireless audio device 115-*f* may send ACK messages without microphone data. A blackout period 443 may occur in the user's audio data until second wireless audio device 115-*f* enables the microphone data 457. Second wireless audio device 115-*f* may start to send microphone data 477.

In some cases, after the handover complete message 401, second wireless audio device 115-*f* may perform the primary wireless audio device role. Wireless host device 110-*d* may send data 405 to second wireless audio device 115-*f*. Second wireless audio device 115-*f* may send an ACK message 410 indicating that data 405 has been received. However, as described above, second wireless audio device 115-*f* may not send microphone data along with ACK message 410.

Wireless host device 110-*d* may send data 415 to second wireless audio device 115-*f*. Second wireless audio device 115-*f* may send an ACK message 420 indicating that data 415 has been received. Wireless host device 110-*d* may send data 425 to second wireless audio device 115-*f*. Second wireless audio device 115-*f* may send an ACK message 430 indicating that data 425 has been received. Wireless host device 110-*d* may send data 435 to second wireless audio device 115-*f*. Because the blackout period 443 is ongoing, second wireless audio device 115-*f* may send an ACK message 440 (e.g., without any microphone data), indicating that data 435 has been received. Wireless host device 110-*d* may send data 445 and 455. Second wireless audio device 115-*f* may have enabled microphone data 457. Wireless host device 110-*d* may send data 465 and 475.

In some cases, second wireless audio device 115-*f* may have had sufficient time to buffer microphone data and transmit it to the wireless host device 110-*d*. This may end blackout period 443. Second wireless audio device 115-*f* may transfer microphone data and ACK messages to the wireless host device 110-*d*. Wireless host device 110-*d* may send data 485 to second wireless audio device 115-*f*. Second wireless audio device 115-*f* may send transmission 450 including data 450-*a* and an ACK message 450-*b* indicating that data 485 has been received. Wireless host device 110-*d* may send data 495 to second wireless audio device 115-*f*. Second wireless audio device 115-*f* may send transmission 460 including data 460-*a* and an ACK message 460-*b* indicating that data 495 has been received. Wireless host device 110-*d* may send data 496 to second wireless audio device 115-*f*. Second wireless audio device 115-*f* may send transmission 470 including data 470-*a* and an ACK message 470-*b* indicating that data 496 has been received. Wireless host device 110-*d* may send data 497 to second wireless audio device 115-*f*. Second wireless audio device 115-*f* may send transmission 480 including data 480-*a* and an ACK message 480-*b* indicating that data 497 has been received.

Thus, as described above with respect to FIG. 3, due to the latencies involved in enabling microphone data, second wireless audio device 115-*f* may not have the microphone data to transmit immediately after the handover complete message 401. A blackout in the user's voice data may occur while second wireless audio device 115-*f* does not transmit microphone data. During this blackout, second wireless audio device 115-*f* may transmit ACK signals. Once second wireless audio device 115-*f* enables the microphone data, it may transmit signal data containing microphone data and ACK signals.

Figure 5:
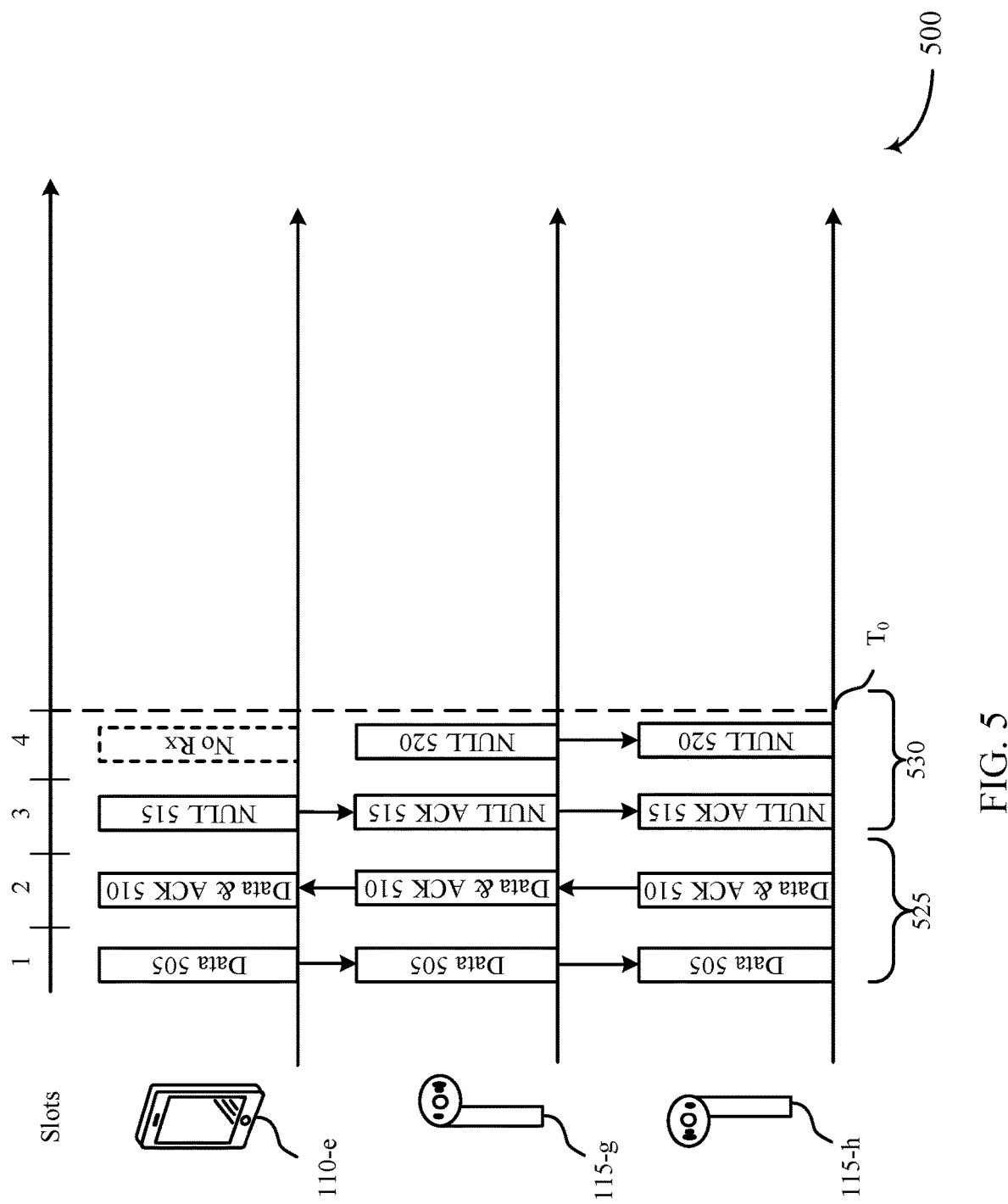
FIG. 5 illustrates an example of a timeline that supports audio synchronization during handover in accordance with aspects of the present disclosure.

FIG. 5 illustrates an example of a timeline 500 that supports audio synchronization during handover in accordance with aspects of the present disclosure. In some examples, timeline 500 may implement aspects of wireless communications systems 100 and 200. For example, wireless host device 110-*e*, first wireless audio device 115-*g*, and second wireless audio device 115-*h* may be examples of corresponding devices in wireless communications systems 100 and 200, and timelines 300, and 400.

In some examples, second wireless audio device 115-*h* may perform the primary wireless audio device role. That is, second wireless audio device 115-*h* may manage an active communication link with wireless host device 110-*e*. First wireless audio device 115-*g* may perform the secondary wireless audio device role and may perform sniffing procedures to receive data from the active communication link between wireless host device 110-*e* and second wireless audio device 115-*h*.

In some examples, communication devices may communicate during one or more eSCO windows. Each eSCO window may include a number of transmission time intervals (TTIs). For instance, a standard eSCO window may include a number of reserved TTIs for data transmission and acknowledgement, and a set of retransmissions TTIs. The reserved and retransmission slots may vary based on a transmission format. For example, devices may send single-slot packets, three-slot packets, five-slot packets, or the like, and eSCO window durations may depend on the packet size. In some examples, an eSCO window may include four TTIs (e.g., 4 slots). Such an eSCO may include a reserved window 525 for communication and acknowledgment, and a retransmission window 530. Second wireless audio device 115-*h* and first wireless audio device 115-*g* may successfully receive a data transmission from wireless host device 110-*e* to second wireless audio device 115-*h*. Wireless host device 110-*e* may transmit and second wireless audio device 115-*h* may receive, in the first Bluetooth slot of eSCO window, data 505 (e.g., audio data). First wireless audio device 115-*g* may monitor communications between second wireless audio device 115-*h* and wireless host device 110-*e* and may also receive data 505. Second wireless audio device 115-*h* may transmit, and wireless host device 110-*e* may receive, in a second Bluetooth slot of the eSCO window, data and ACK signal 510, indicating successful receipt of data 505. First wireless audio device 115-*g* may monitor communications between second wireless audio device 115-*h* and wireless host device 110-*e* and may also receive data and ACK signal 510. In some examples, the first Bluetooth slot and second Bluetooth slot of eSCO window may be reserved slots in reserved window 525.

In a third Bluetooth slot of an eSCO window (e.g., a first Bluetooth slot of a retransmission window 530) wireless host device 110-*e* may transmit a null signal 515 to second wireless audio device 115-*h*. First wireless audio device 115-*g* may monitor communications between second wireless audio device 115-*h* and wireless host device 110-*e* and may also receive null signal 515. In some examples, null signal 515 may be a null ACK signal. The null portion of the null ACK signal may indicate that wireless host device 110-*e* will not transmit or retransmit any transmissions for the duration of eSCO window 530. The ACK portion of the null ACK signal may indicate that wireless host device 110-*e* received ACK signal 510 and any additional transmissions sent by second wireless audio device 115-*g* with ACK signal 510.

First wireless audio device 115-*g* and second wireless audio device 115-*h* may communicate in a fourth Bluetooth slot (e.g., a second Bluetooth slot of a retransmission window 530) of eSCO window. First wireless audio device 115-*g* may transmit null signal 520 to second wireless audio device 115-*h*. Upon transmission of the null signal 520, which indicates that no additional signaling will occur for the duration of the eSCO window, first wireless audio device 115-*g* and second wireless audio device 115-*h* may close the eSCO window. At time $T_0$ the eSCO window may terminate and first wireless audio device 115-*g* and second wireless audio device 115-*h* may cease to transmit or receive for that particular eSCO window. In some examples, TWS shadowing may use the eSCO window to retransmit missed packets between first wireless audio device 115-*g* and second wireless audio device 115-*h*. In some examples, a standard or default eSCO window (e.g., a four slot eSCO window) may be used for some communications. However, during a handover procedure, an eSCO window duration may be extended for the duration of the handover procedure for communication between first wireless audio device 115-g and second wireless audio device 115-h, as described in greater detail with respect to FIG. 6. For example, prior to a handover procedure, first wireless audio device 115-g and second wireless audio device 115-h may use a default eSCO window duration (e.g., a four-slot eSCO window duration). Upon initiation of a handover procedure, first wireless audio device 115-g and second wireless audio device 115-h may use a longer eSCO window duration (e.g., an eSCO window with an extended retransmission window, as described in greater detail with respect to FIG. 6). Upon completion of the handover procedure, first wireless audio device 115-g and second wireless audio device 115-h may revert to the default eSCO window duration for subsequent communications.

Figure 6:
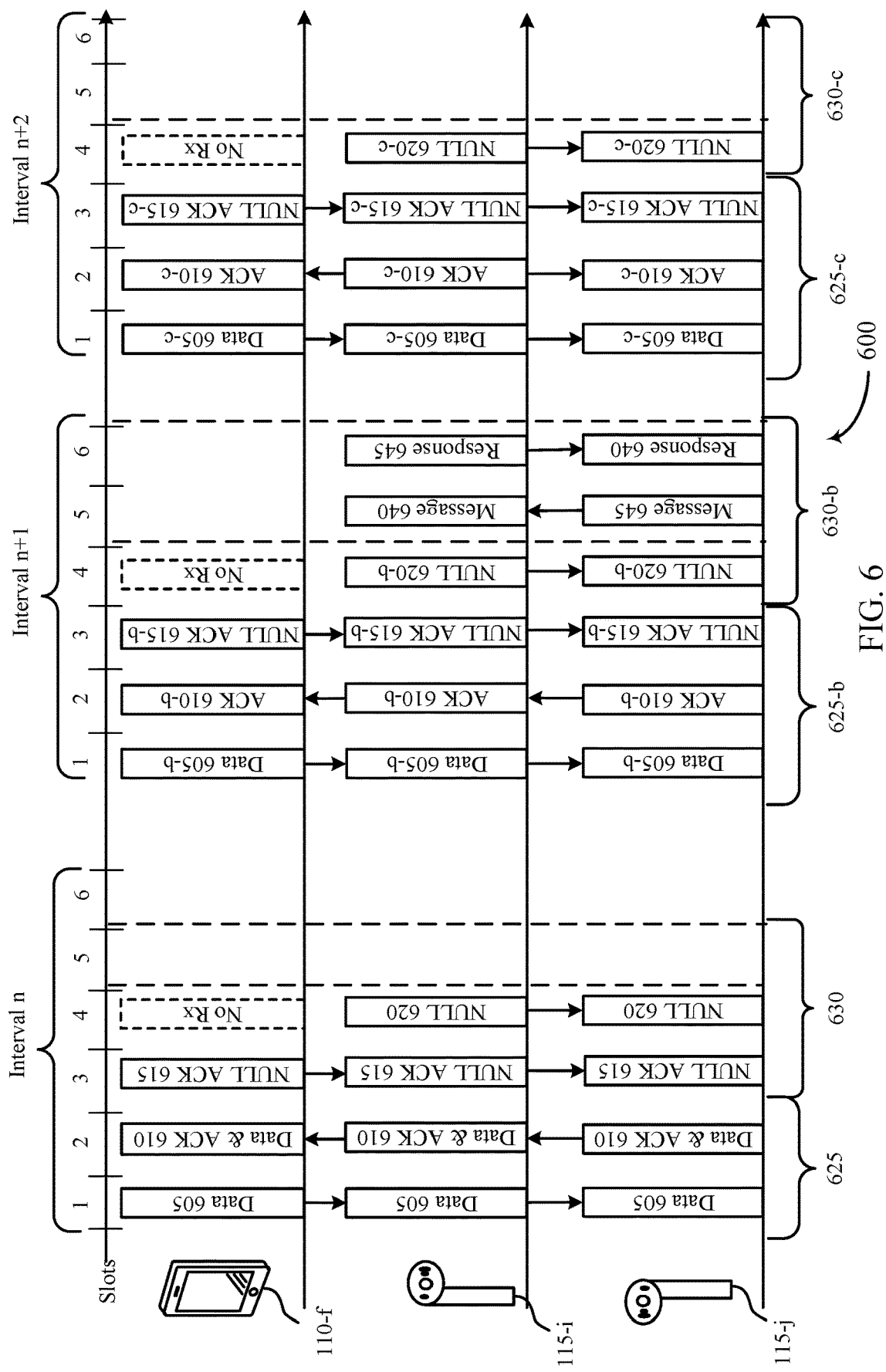
FIG. 6 illustrates an example of a timeline that supports audio synchronization during handover in accordance with aspects of the present disclosure.

FIG. 6 illustrates an example of a timeline 600 that supports audio synchronization during handover in accordance with aspects of the present disclosure. In some examples, timeline 600 may implement aspects of wireless communications systems 100 and 200. For example, wireless host device 110-f, first wireless audio device 115-i, and second wireless audio device 115-j may be examples of corresponding devices in wireless communications systems 100 and 200, and timelines 300, 400, and 500.

In some examples, second wireless audio device 115-j may perform the primary wireless audio device role. That is, second wireless audio device 115-j may use an active communication link with wireless host device 110-f. First wireless audio device 115-i may perform the secondary wireless audio device role and may perform sniffing procedures to receive data from the active communication link between wireless host device 110-f and second wireless audio device 115-j. In some examples, wireless audio devices 115 and host devices may communicate (e.g., using a default eSCO window duration (e.g., as described with respect to FIG. 5). In some examples, first wireless audio device 115-i and second wireless audio device 115-j may communicate with each other (e.g., during a synchronization procedure). One or both of first wireless audio device 115-i, and second wireless audio device 115-j may monitor link quality between the second wireless audio device 115-j and host device 110-f. In some examples, one or both of first wireless audio device 115-i, and second wireless audio device 115-j may determine to initiate a handover procedure (e.g., switching roles between first wireless audio device 115-i, and second wireless audio device 115-j). In some examples, the determination to initiate the handover procedure may be based on one or more parameters (e.g., link quality). First wireless audio device 115-i, and second wireless audio device 115-j may communicate and may initiate the handover procedure. For instance, second wireless audio device 115-j may send an initiation message to first wireless audio device 115-i, and first wireless audio device 115-j may respond to the message. In some examples, both devices may simultaneous determine to initiate the handover procedure, without communicating with each other, according to device-specific logic. Upon initiating the handover procedure, first wireless audio device 115-i, and second wireless audio device 115-j may utilize a longer eSCO window, including an extended retransmission window, as shown herein with respect to FIG. 6.

In some examples, upon initiating a handover procedure, second wireless audio device 115-j and first wireless audio device 115-i may communicate using longer eSCO windows during one or more intervals of the handover procedure. For example, during interval n, wireless host device 110-f may transmit, and second wireless audio device 115-j may receive, in the first Bluetooth slot of an eSCO window, data 605 (e.g., voice data). First wireless audio device 115-i may monitor communications between second wireless audio device 115-j and wireless host device 110-f and may also receive data 605. Second wireless audio device 115-j may transmit, and wireless host device 110-f may receive, in a second Bluetooth slot of an eSCO window, data and ACK signal 610, indicating successful receipt of data 605. First wireless audio device 115-i may monitor communications between second wireless audio device 115-j and wireless host device 110-f and may also receive data and ACK signal 610. In some examples, the first Bluetooth slot and second Bluetooth slot of eSCO window may be reserved slots in window 625.

In a third Bluetooth slot of an eSCO window (e.g., a first Bluetooth slot of a retransmission window 630) wireless host device 110-f may transmit a null signal 615 to second wireless audio device 115-j. First wireless audio device 115-i may monitor communications between second wireless audio device 115-j and wireless host device 110-f and may also receive null signal 615. In some examples, null signal 615 may be a null ACK signal. The null portion of the null ACK signal may indicate that wireless host device 110-f will not transmit or retransmit any transmissions for the duration of eSCO window 630. The ACK portion of the null ACK signal may indicate that wireless host device 110-f received ACK signal 610 and any additional transmissions send by second wireless audio device 115-j with ACK signal 610.

In some examples, first wireless audio device 115-I and second wireless audio device 115-j may utilize an extended retransmission window of an eSCO window to ensure a successful completion of a handover procedure. First wireless audio device 115-i and second wireless audio device 115-j may communicate in a fourth Bluetooth slot (e.g., a second Bluetooth slot of a retransmission window 630) of an eSCO window during interval n. First wireless audio device 115-i may transmit null signal 620 to second wireless audio device 115-j. However, instead of closing the eSCO window after communicating null signal 615, the eSCO window may remain open and first wireless audio device 115-i and second wireless audio device 115-j may continue to monitor for communications during slot 5 of interval n. If no communication occurs during slot 5, then at slot 6, the eSCO window may terminate and first wireless audio device 115-i and second wireless audio device 115-j may cease to transmit or receive signals for the duration of interval n. In some examples, TWS shadowing may use the eSCO window to retransmit missed packets between first wireless audio device 115-i and second wireless audio device 115-j.

In some examples, during interval n+1 second wireless audio device 115-j may continue to perform the primary wireless audio device role (e.g., while first wireless audio device 115-i buffers microphone data in preparation for taking over the role of primary wireless audio device per the handover procedure). In some examples, second wireless audio device 115-j and first wireless audio device 115-i may successfully receive a data transmission from wireless host device 110-f to second wireless audio device 115-j during interval n+1. Second wireless audio device 115-j may identify an ideal eSCO window for transferring ownership of the communication link and switching roles. In some examples, second wireless audio device 115-j may identify interval n+1 as the eSCO window during which to make the role switch. Wireless host device 110-f may transmit, and second wireless audio device 115-j may receive, in the first Bluetooth slot of eSCO window, data 605-b (e.g., voice data). First wireless audio device 115-*i* may monitor communications between second wireless audio device 115-*j* and wireless host device 110-*f* and may also receive data 605-*b*. Second wireless audio device 115-*j* may transmit, and wireless host device 110-*f* may receive, in a second Bluetooth slot of eSCO window, data and ACK signal 610-*b*, indicating successful receipt of data 605-*b*. First wireless audio device 115-*i* may monitor communications between second wireless audio device 115-*j* and wireless host device 110-*f* and may also receive data and ACK signal 610-*b*. In some examples, the first Bluetooth slot and second Bluetooth slot of eSCO window may be reserved slots in window 625-*b*.

During a third Bluetooth slot of an eSCO window (e.g., a first Bluetooth slot of a retransmission window 630-*b*) wireless host device 110-*f* may transmit a null signal 615-*b* to second wireless audio device 115-*j*. First wireless audio device 115-*i* may monitor communications between second wireless audio device 115-*j* and wireless host device 110-*f* and may also receive null signal 615-*b*. In some examples, null signal 615-*b* may be a null ACK signal. The null portion of the null ACK signal may indicate that wireless host device 110-*f* will not transmit or retransmit any transmissions for the duration of eSCO window 630-*b*. The ACK portion of the null ACK signal may indicate that wireless host device 110-*f* received ACK signal 610-*b* and any additional transmissions send by second wireless audio device 115-*j* with ACK signal 610-*b*. First wireless audio device 115-*i* and second wireless audio device 115-*j* may communicate during a fourth Bluetooth slot (e.g., a second Bluetooth slot of a retransmission window 630-*b*) of eSCO window. First wireless audio device 115-*i* may transmit null signal 620-*b* to second wireless audio device 115-*j*.

In some examples, during slot 5, the eSCO window may remain open and first wireless audio device 115-*i* and second wireless audio device 115-*j* may continue to monitor for communication. Second wireless audio device 115-*j* may identify interval n+1 as an appropriate window during which to indicate the role switch. In a fifth Bluetooth slot of an extended eSCO window, second wireless audio device 115-*j* may transmit message 640 to first wireless audio device 115-*i* to request that first wireless audio device 115-*i* switch roles as part of the handover procedure. In a sixth Bluetooth slot of the eSCO window of interval n+1, first wireless audio device 115-*i* may transmit response 645 to second wireless audio device 115-*j* to communicate that it accepts the primary wireless audio device role from second wireless audio device 115-. Upon communication of response 645, the eSCO window may terminate which indicates that no additional signaling will occur for the duration of the eSCO window of interval n+1.

In some examples, in interval n+2 first wireless audio device 115-*i* may assume and perform the primary wireless audio device role. That is, first wireless audio device 115-*i* may use the active communication link with wireless host device 110-*f*. Second wireless audio device 115-*j* may perform the secondary wireless audio device role and may perform sniffing procedures to receive data from the active communication link between wireless host device 110-*f* and first wireless audio device 115-*i*.

In some examples, first wireless audio device 115-*i* and second wireless audio device 115-*j* may successfully receive a data transmission from wireless host device 110-*f* to first wireless audio device 115-*i*. Wireless host device 110-*f* may transmit and first wireless audio device 115-*i* may receive, in the first Bluetooth slot of eSCO window, data 605-*c* (e.g., voice data). Second wireless audio device 115-*j* may monitor communications between first wireless audio device 115-*i* and wireless host device 110-*f* and may also receive data 605-*c*. First wireless audio device 115-*i* may transmit, and wireless host device 110-*f* may receive, in a second Bluetooth slot of eSCO window, data and ACK signal 610-*c*, indicating successful receipt of data 605-*c*. Second wireless audio device 115-*j* may monitor communications between first wireless audio device 115-*i* and wireless host device 110-*f* and may also receive data and ACK signal 610-*c*. In some examples, the first Bluetooth slot and second Bluetooth slot of eSCO window may be reserved slots in window 625-*c*.

In a third Bluetooth slot of an eSCO window (e.g., a first Bluetooth slot of a retransmission window 630-*b*) wireless host device 110-*f* may transmit a null signal 615-*c* to first wireless audio device 115-*i*. Second wireless audio device 115-*j* may monitor communications between first wireless audio device 115-*i* and wireless host device 110-*f* and may also receive null signal 615-*c*. In some examples, null signal 615-*c* may be a null ACK signal. The null portion of the null ACK signal may indicate that wireless host device 110-*f* will not transmit or retransmit any transmissions for the duration of eSCO window 630-*c*. The ACK portion of the null ACK signal may indicate that wireless host device 110-*f* received ACK signal 610-*c* and any additional transmissions sent by first wireless audio device 115-*i* with ACK signal 610-*c*.

First wireless audio device 115-*g* and second wireless audio device 115-*h* may communicate during a fourth Bluetooth slot (e.g., a second Bluetooth slot of a retransmission window 630-*a*) of eSCO window. First wireless audio device 115-*i* may transmit null signal 620-*c* to second wireless audio device 115-*j*. Upon transmission of the null signal 620-*c*, which indicates that no additional signaling will occur for the duration of the eSCO window, first wireless audio device 115-*i* and second wireless audio device 115-*j* may close eSCO window. During slot 5, the eSCO window may terminate and first wireless audio device 115-*i* and second wireless audio device 115-*j* may cease to transmit or receive. In some examples, after the completion of the handover procedure, first wireless audio device 115-*i* and second wireless audio device 115-*j* may revert to a default eSCO window duration (e.g., instead of continuing to monitor for a fifth and sixth slot of an eSCO window after a null message is transmitted).

Figure 7:
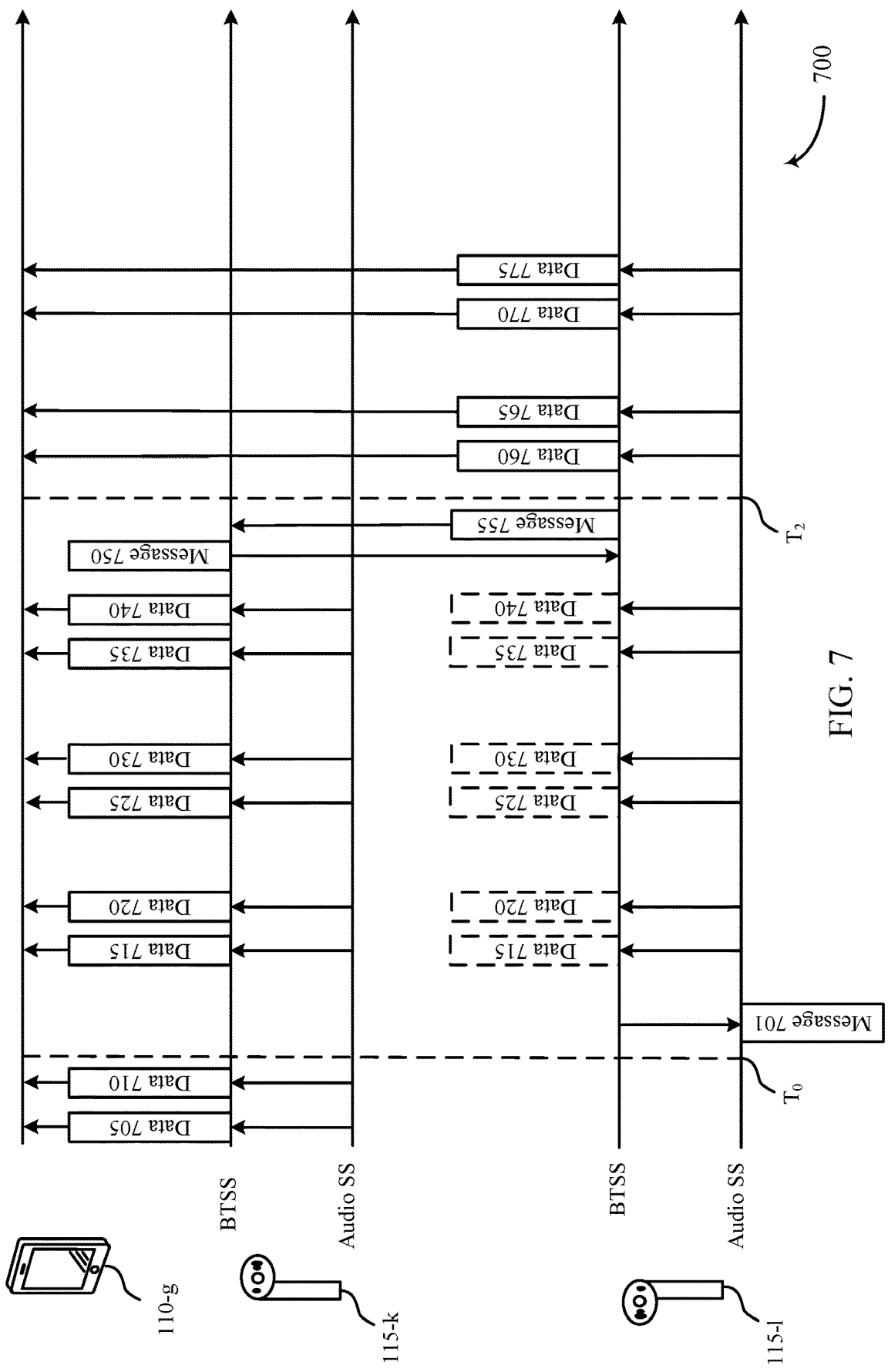
FIG. 7 illustrates an example of a timeline that supports audio synchronization during handover in accordance with aspects of the present disclosure.

FIG. 7 illustrates an example of a timeline 700 that supports audio synchronization during handover in accordance with aspects of the present disclosure. In some examples, timeline 700 may implement aspects of wireless communications systems 100 and 200. For example, wireless host device 110-*g*, first wireless audio device 115-*k*, and second wireless audio device 115-*l* may be examples of corresponding devices in wireless communications systems 100 and 200, and timelines 300, 400, 500, and 600.

In some examples, first wireless audio device 115-*k* may initially perform the primary wireless audio device role. That is, first wireless audio device 115-*k* may use the active communication link with wireless host device 110-*g*. Second wireless audio device 115-*l* may initially perform the secondary wireless audio device role and may perform sniffing procedures to receive data from the active communication link between wireless host device 110-*g* and first wireless audio device 115-*k*. First wireless audio device 115-*k* and second wireless audio device 115-*l* may include a BTSS module and an audio SS module, which may internally communicate with each other.

In some examples, first wireless audio device 115-*k* may perform the role of a primary wireless audio device, and may transmit data to a host device 110-*g*. The data may be received from the audio SS module at a BTSS module. First wireless audio device 115-*k* may transmit data 705 and data 710 to wireless host device 110-*g*. At time $T_0$ first wireless audio device 115-*k* may initiate a handover procedure. Second wireless audio device 115-*l* may transmit a message 701, which may enable microphone data at the audio SS of wireless audio device 115-*l*. The handover procedure may require a variable amount of time to complete as it may involve marshaling of stack states, synchronizing link on secondary, role switch, bd address swap etc. The handover procedure may last until time $T_1$. During the handover interval between $T_0$ and $T_1$, while the handover procedure is taking place, first wireless audio device 115-*k* may still perform the primary wireless audio device role.

While first wireless audio device 115-*k* continues to perform the role of primary wireless audio device, second wireless audio device 115-*l* may buffer audio (e.g., microphone) data packets (e.g., to avoid a subsequent blackout period when the handover procedure is complete). Instead of transmitting buffered packets, second wireless audio device 115-*l* may discard the data packets it receives from the audio SS module until first wireless audio device 115-*k* signals that the handover procedure is complete. For example, first wireless audio device 115-*k* may send transmission data 715 to wireless host device 110-*g*. Second wireless audio device 115-*l* may buffer and discard data 715 to avoid sending duplicate transmission data to wireless host device 110-*g*. First wireless audio device 115-*k* may send data 720, 725, 730, 735, and 740 to wireless host device 110-*g*. Second wireless audio device 115-*l* may buffer and discard data 720, 725, 730, 735, and 740 to avoid sending duplicate transmission data to wireless host device 110-*g*. First wireless audio device 115-*k* may identify a suitable eSCO window in which to indicate to the second wireless audio device 115-*k* to assume and perform the primary wireless audio device role. First wireless audio device 115-5 may transmit message 750 (e.g., a handover indication) to second wireless audio device 115-*l*. In response, second wireless audio device 115-*l* may send message 760 (e.g., a handover indication response) to first wireless audio device 115-*k* to signal to first wireless audio device 115-*k* acceptance of the primary role.

In some examples, at time $T_1$, (e.g., when the handover procedure is complete as indicated by message 750 and message 755), second wireless audio device 115-*l* may assume and perform the primary wireless audio device role. That is, second wireless audio device 115-*l* may use the active communication link with wireless host device 110-*g*. First wireless audio device 115-*k* may assume and perform the secondary wireless audio device role, and may perform sniffing procedures to receive data from the active communication link between wireless host device 110-*g* and second wireless audio device 115-*l*. First wireless audio device 115-*k* and second wireless audio device 115-*l* may perform the role switch soon after or immediately after $T_1$. Because of the previous buffering of data packets, second wireless audio device 115-*l* may be prepared to transmit data 760, data 765, data 770, and data 775 to wireless host device 110-*g* without a user blackout period.

In some examples, due to the synchronous nature of user voice data, the microphones on both the first wireless audio device 115-*k* and second wireless audio device 115-*l* may deliver the same audio packet at a given instant to the BT Controller (e.g., as described herein with respect to FIG. 7). This may allow wireless audio device in the primary role to send voice data without duplicating previous packets or creating glitch in user voice data. In some examples, due to the asymmetrical operations of wireless audio devices, there is a possibility that microphone data on the wireless audio device in the new primary role may be ahead or behind in time at a given instance compared to the microphone data on the wireless audio device in the new secondary role. The wireless audio devices may calibrate the microphone data by exchanging a few samples with the master BT clock to arrive at a time offset for microphone data to be sent over the air after the handover procedure as described in greater detail with respect to FIG. 8.

Figure 8:
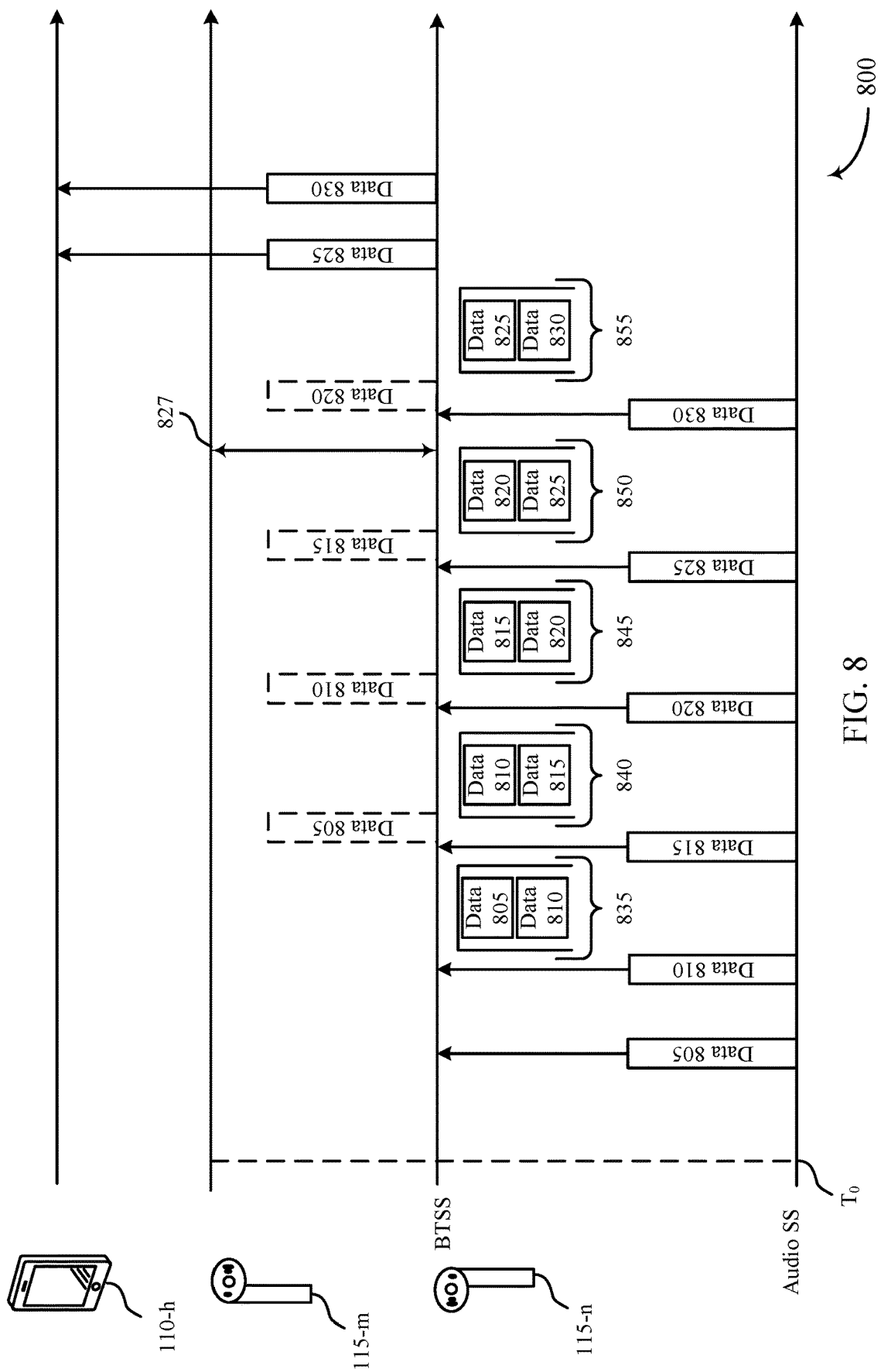
FIG. 8 illustrates an example of a timeline that supports audio synchronization during handover in accordance with aspects of the present disclosure.

FIG. 8 illustrates an example of a timeline 800 that supports audio synchronization during handover in accordance with aspects of the present disclosure. In some examples, timeline 800 may implement aspects of wireless communications systems 100 and 200. For example, wireless host device 110-*h*, first wireless audio device 115-*m*, and second wireless audio device 115-*n* may be examples of corresponding devices in wireless communications systems 100 and 200, and timelines 300, 400, 500, 600, and 700.

In some examples, first wireless audio device 115-*m* may initially perform the primary wireless audio device role. That is, first wireless audio device 115-*m* may use the active communication link (e.g. eSCO link) with wireless host device 110-*h*. Second wireless audio device 115-*n* may initially perform the secondary wireless audio device role and may perform sniffing procedures to receive data from the active communication link between wireless host device 110-*h* and first wireless audio device 115-*m*.

In some examples, at time $T_0$ first wireless audio device 115-*m* in the primary role may initiate the handover procedure and signal to second wireless audio device 115-*n* to switch roles. During the handover procedure, second wireless audio device 115-*n* may still be in secondary role and may buffer microphone data at an earlier or later time compared to the microphone data of first wireless audio device 115-*m* operating in the primary role. Second wireless audio device 115-*n* may discard data packets containing the microphone data during the handover procedure so duplicate data packets are not sent to the wireless host device.

In some examples, first wireless audio device 115-*m* and second wireless audio device 115-*n* may contain a BTSS module and an audio SS module. The audio SS module may timestamp each data packet (e.g. eSCO data packet) which second wireless audio device 115-*n* buffers. The timestamp may be based on the master clock of the first wireless audio device 115-*m* operating in the primary role. The audio SS module may deliver the timestamp as meta data synchronized to the master clock of the first wireless audio device 115-*m*. The timestamp procedure may occur during the handover procedure on first wireless audio device 115-*m* and second wireless audio device 115-*n* when microphone data is enabled. First wireless audio device 115-*m* may indicate for second wireless audio device 115-*n* to assume and perform the primary role. First wireless audio device 115-*m* may communicate the role switch using a message (e.g. a baseband message). First wireless audio device 115-*m* may also indicate the timestamp of the recent eSCO data sent to wireless host device 110-*h*. Second wireless audio device 115-*n* may check if any eSCO packets are buffered in BTSS module which are older than the time combination of the timestamp of the recent eSCO data and max time of system latency. ESCO packets older than this time combination may be discarded as duplicate packets. Audio SS module may deliver the eSCO packets apart from each other so that the max time of system latency is smaller than the eSCO packet generation level. Wireless audio devices may create an accurate filter to discard the duplicate data.

In some examples, upon initiation of the handover procedure, the audio SS module of second wireless audio device 115-*n* may send data to the BTSS module of second wireless audio device 115-*n*. The data may include eSCO data (e.g., microphone data) and meta data containing a timestamp synchronized to the master clock of the first wireless audio device 115-*m*. The audio SS module may send data 805 and data 810 to the BTSS module. Second wireless audio device 115-*n* may group data 805 and data 810 together in buffer 835, and may identify which packets to discard. First wireless audio device 115-*m* may also timestamp packets (e.g., during the handover procedure) and transmit them to host device 110-*h*. Second wireless audio device 115-*n* may sniff the packets transmitted by first wireless audio device 115-*m*, and may discard duplicate packets. In some examples, second wireless audio device 115-*n* may compare the timestamps of data 805 and 810 in buffer 835 to a timestamp of a most recent packet transmitted from first wireless audio device 115-*m* to host device 110-*h*, and may discard already transmitted packets.

Second wireless audio device 115-*n* may continue to perform the role of secondary wireless audio device, and may discard buffered packets during the handover procedure. The audio SS module may send data 805 and data 810 to the BTSS module, and second wireless audio device 115-*n* may group data 805 and data 810 into buffer 835. Upon sniffing data 805 being transmitted from second wireless audio device 115-*m* to host device 110-*h*, second wireless audio device 115-*n* may discard data 805, maintaining data 810 in buffer 840 (e.g., the same buffer but at a later point in time). The audio SS module may send data 815, data 820, and data 825 to the BTSS module. Second wireless audio device 115-*n* may group data 810 and data 815 together in buffer 840 after discarding data. Upon determining that data 810 has been transmitted by first wireless audio device 115-*m* (e.g., via sniffing or comparing timestamps as described below), second wireless audio device 115-*n* may discard data 810. Similarly, second wireless audio device 115-*n* may group data 815 and data 820 together in buffer 845 and then discard data 815 upon determining that data 815 has already been transmitted, may group data 820 and data 825 together in buffer 850.

In some examples, first wireless audio device 115-*m* may indicate the handover procedure is complete and second wireless audio device 115-*n* may respond via signaling 827 (e.g., as described in greater detail with respect to FIGS. 6-7). Signaling 827 from first wireless audio device 115-*m* may include a timestamp for a last data packet transmitted by first wireless audio device 115-*m*. Second wireless audio device 115-*n* may assume and perform the primary wireless device role. The audio SS module of second wireless audio device 115-*n* may send data 830 to BTSS module. Second wireless audio device 115-*n* may group data 825 and data 830 together in buffer 855, including the timestamps for each data packet. However, due to the asymmetrical operations of first wireless audio device 115-*m* and second wireless audio device 115-*n*, one or both of data 825 and data 830 may have already been transmitted by first wireless audio device 15-*m*. To ensure that duplicate packets are not transmitted, second wireless audio device may compare the timestamps of data 825 and data 830 in the buffer to the last eSCO data packet transmitted by first wireless audio device 115-*m* (e.g., as indicated via signaling 827, such as a handover indication message). If a buffered packet at the BTSS module is older than the timestamp of the last transmitted data packet plus a maximum system latency, then the packet has already been transmitted. In such examples, second wireless audio device 115-*n* may discard any duplicate packets. For instance, second wireless audio device 115-*n* may determine that the timestamp of data 820 is older than the timestamp of the oldest data packet transmitted by first wireless audio device 115-*m* plus the maximum system latency, and may discard data 820. However, secondary wireless audio device 115-*n* may also determine that data 830 is not older than the timestamp of the oldest data packet transmitted by first wireless audio device 115-*m* plus the maximum system latency, and is therefore not a duplicate. In such examples, second wireless audio device 115-*n* acting in the primary wireless device role may send data 825 and data 830 to wireless host device 110-*h* using the active communication link (e.g. eSCO link) with wireless host device 110-*h*. If both data 825 and data 830 are duplicates, based on the above described comparing, then second wireless audio device 115-*n* may discard both packets as duplicates. If neither of data 825 and data 830 are duplicates, based on the above described comparing, then second wireless audio device 115-*n* may transmit both packets to host device 110-*h*. First wireless audio device 115-*m* may perform the secondary wireless audio device role and may perform sniffing procedures to receive data from the active communication link between wireless host device 110-*h* and second wireless audio device 115-*n*.

Figure 9:
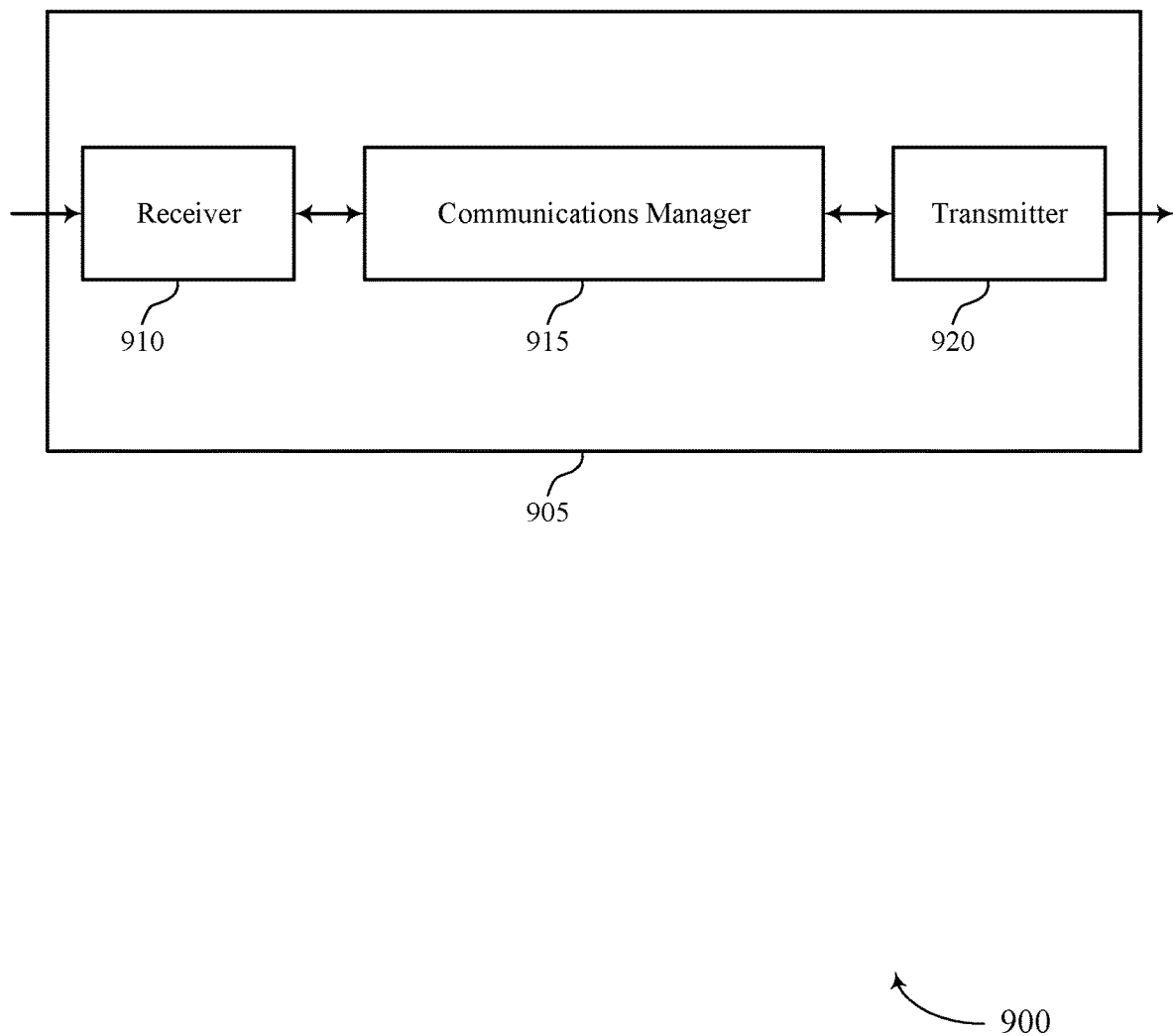
FIGS. 9 and 10 show block diagrams of devices that support audio synchronization during handover in accordance with aspects of the present disclosure.

FIG. 9 shows a block diagram 900 of a device 905 that supports audio synchronization during handover in accordance with aspects of the present disclosure. The device 905 may be an example of aspects of a device as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to audio synchronization during handover, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may initiate a handover interval including one or more extended synchronous connection-oriented (eSCO) windows, transmit, to a host device based on the handover indication, one or more audio (e.g., microphone) data packets during a second eSCO window that is subsequent to the handover interval, buffer a set of one or more audio data packets during the handover interval, discard at least a portion of the set of one or more audio data packets during the handover interval, and receive, during an extended retransmission portion of a first eSCO window of the handover interval, a handover indication from a second wireless audio device. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
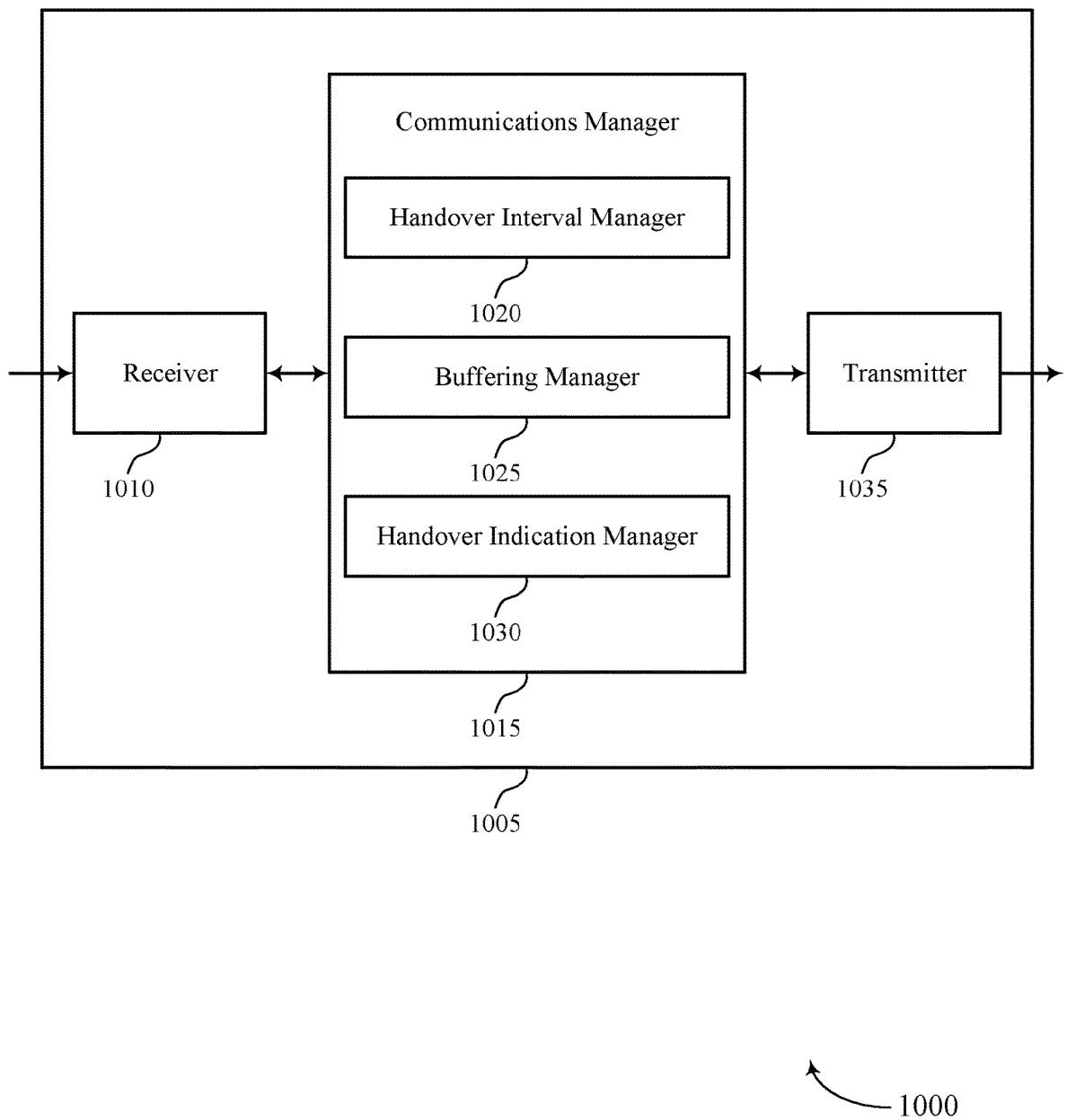

FIG. 10 shows a block diagram 1000 of a device 1005 that supports audio synchronization during handover in accordance with aspects of the present disclosure. The device 1005 may be an example of aspects of a device 905 or a device 115 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to audio synchronization during handover, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a handover interval manager 1020, a buffering manager 1025, and a handover indication manager 1030. The communications manager 1015 may be an example of aspects of the communications manager 1210 described herein.

The handover interval manager 1020 may initiate a handover interval including one or more extended synchronous connection-oriented (eSCO) windows and transmit, to a host device based on the handover indication, one or more audio (e.g., microphone) data packets during a second eSCO window that is subsequent to the handover interval.

The buffering manager 1025 may buffer a set of one or more audio data packets during the handover interval and discard at least a portion of the set of one or more audio data packets during the handover interval.

The handover indication manager 1030 may receive, during an extended retransmission portion of a first eSCO window of the handover interval, a handover indication from a second wireless audio device.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
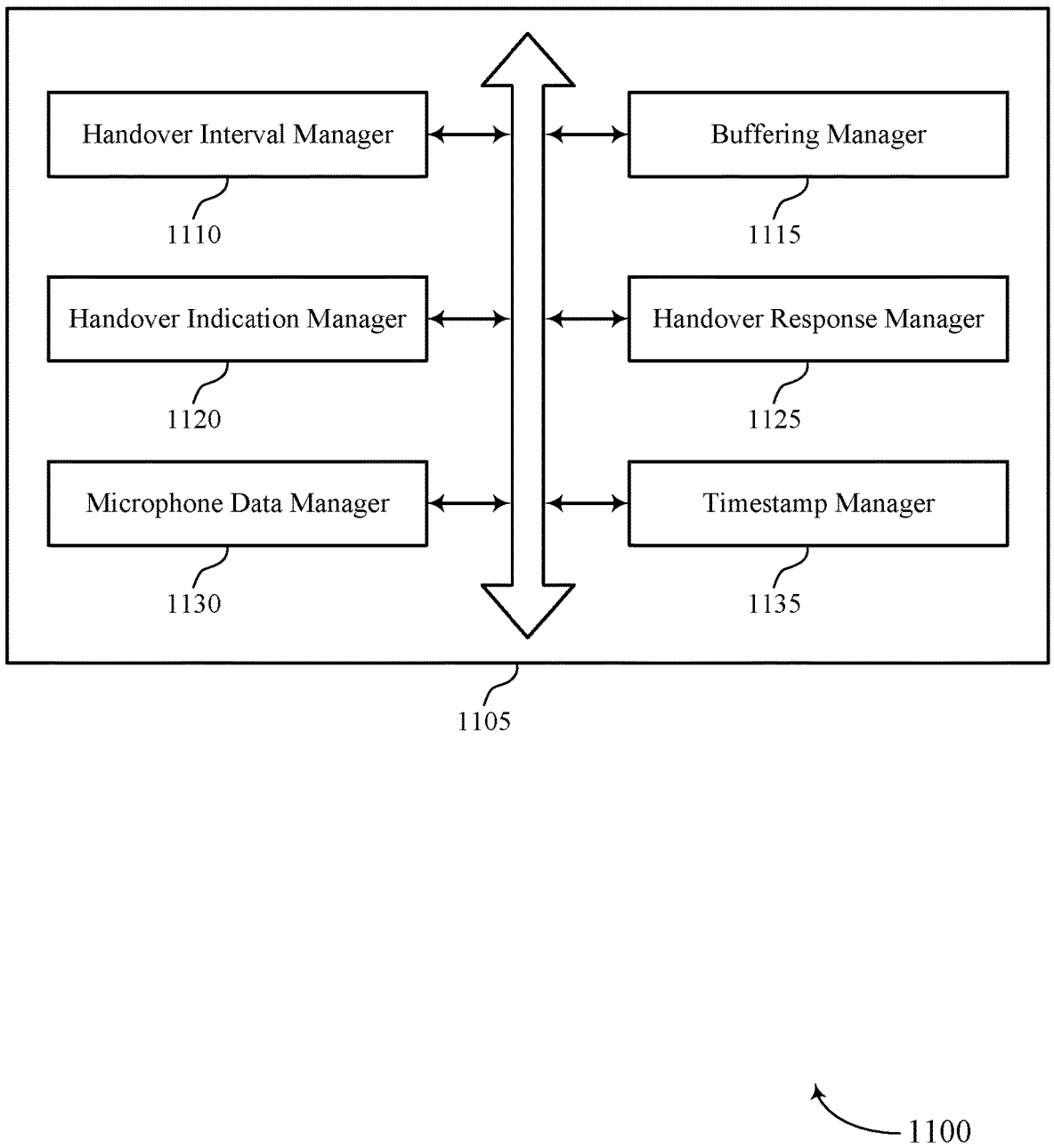
FIG. 11 shows a block diagram of a communications manager that supports audio synchronization during handover in accordance with aspects of the present disclosure.

FIG. 11 shows a block diagram 1100 of a communications manager 1105 that supports audio synchronization during handover in accordance with aspects of the present disclosure. The communications manager 1105 may be an example of aspects of a communications manager 915, a communications manager 1015, or a communications manager 1210 described herein. The communications manager 1105 may include a handover interval manager 1110, a buffering manager 1115, a handover indication manager 1120, a handover response manager 1125, a microphone data manager 1130, and a timestamp manager 1135. Each of these modules may communicate, directly or indirectly, with one another (e.g., via one or more buses).

The handover interval manager 1110 may initiate a handover interval including one or more extended synchronous connection-oriented (eSCO) windows. In some examples, the handover interval manager 1110 may transmit, to a host device based on the handover indication, one or more audio (e.g., microphone) data packets during a second eSCO window that is subsequent to the handover interval. In some examples, the handover interval manager 1110 may communicate with the second wireless audio device.

In some examples, the handover interval manager 1110 may identify, based on the communicating, a link quality between the second wireless audio device and the host device; where initiating the handover interval is based on the identified link quality. In some examples, the handover interval manager 1110 may revert to a default eSCO window duration that does not include an extended retransmission portion upon terminating the handover interval, where the default eSCO window duration is shorter than a duration of the one or more eSCO windows included in the handover interval. In some cases, the communicating is performed over an eSCO link between the first wireless audio device and the second wireless audio device. In some cases, the second eSCO window is consecutive to the first eSCO window.

The buffering manager 1115 may buffer a set of one or more audio (e.g., microphone) data packets during the handover interval. In some examples, the buffering manager 1115 may discard at least a portion of the set of one or more audio data packets during the handover interval.

The handover indication manager 1120 may receive, during an extended retransmission portion of a first eSCO window of the handover interval, a handover indication from a second wireless audio device. In some examples, the handover indication manager 1120 may monitor, based on initiating the handover interval, for the handover indication during the extended retransmission portion of the first eSCO window of the handover interval, where receiving the handover indication is based on the monitoring.

The handover response manager 1125 may transmit, based on receiving the handover indication, a handover indication response to the second wireless audio device during the extended retransmission portion of the first eSCO window, where transmitting the one or more audio data packets during the second eSCO window is based on the handover indication response.

The microphone data manager 1130 may enable microphone data for the first wireless audio device, based on initiating the handover interval, where buffering the set of one or more audio data packets is based on enabling the microphone data.

The timestamp manager 1135 may timestamp, by an audio synchronization system of the first wireless audio device, each of the buffered set of one or more audio data packets. In some examples, the timestamp manager 1135 may identify, based on the handover indication, a timestamp for a last audio data packet transmitted by the second wireless audio device to the host device.

In some examples, the timestamp manager 1135 may determine, based on the timestamping, whether one or more of the buffered set of one or more audio data packets is older than the timestamp for the last audio data packet transmitted by the second wireless audio device to the host device plus a maximum system latency. In some examples, the timestamp manager 1135 may upon determining that one or more of the buffered set of one or more audio data packets is older than the timestamp for the last audio data packet transmitted by the second wireless audio device to the host device plus a maximum system latency, discarding the one or more of the buffered set of one or more audio data packets.

Figure 12:
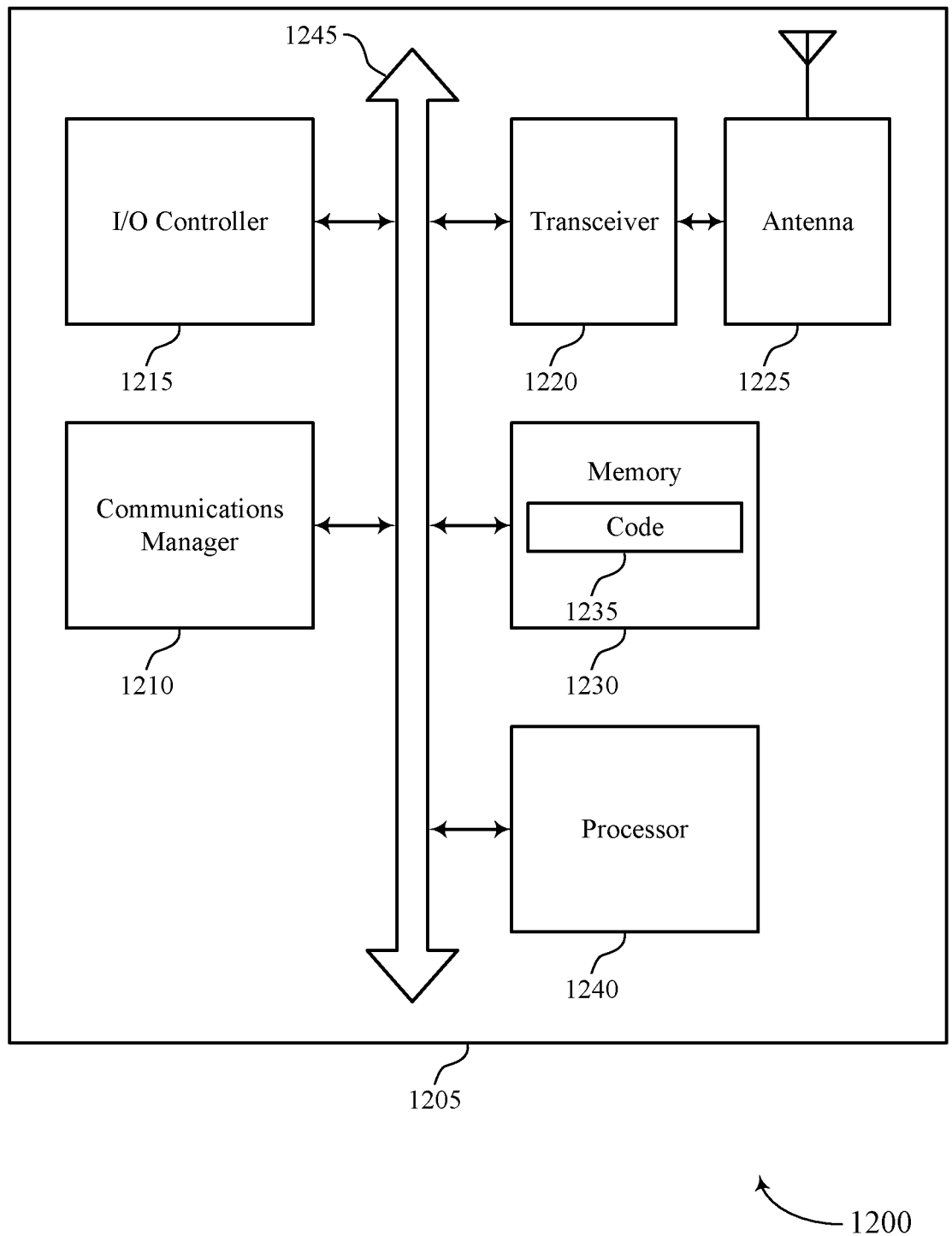
FIG. 12 shows a diagram of a system including a device that supports audio synchronization during handover in accordance with aspects of the present disclosure.

FIG. 12 shows a diagram of a system 1200 including a device 1205 that supports audio synchronization during handover in accordance with aspects of the present disclosure. The device 1205 may be an example of or include the components of device 905, device 1005, or a device as described herein. The device 1205 may include components for bidirectional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may initiate a handover interval including one or more extended synchronous connection-oriented (eSCO) windows, transmit, to a host device based on the handover indication, one or more audio (e.g., microphone) data packets during a second eSCO window that is subsequent to the handover interval, buffer a set of one or more audio data packets during the handover interval, discard at least a portion of the set of one or more audio data packets during the handover interval, and receive, during an extended retransmission portion of a first eSCO window of the handover interval, a handover indication from a second wireless audio device.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting audio synchronization during handover).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
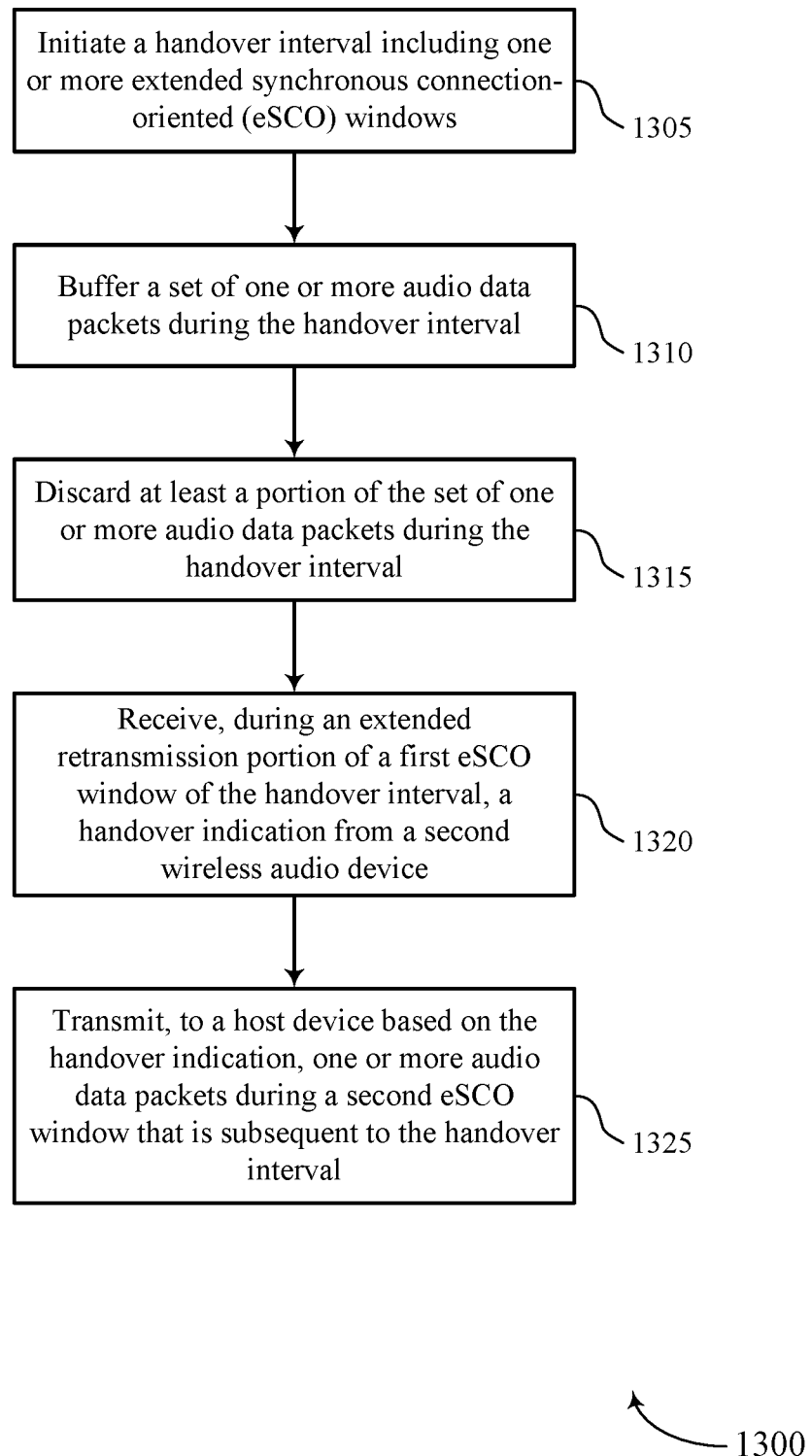
FIGS. 13 and 14 show flowcharts illustrating methods that support audio synchronization during handover in accordance with aspects of the present disclosure.

FIG. 13 shows a flowchart illustrating a method 1300 that supports audio synchronization during handover in accordance with aspects of the present disclosure. The operations of method 1300 may be implemented by a device or its components as described herein. For example, the operations of method 1300 may be performed by a communications manager as described with reference to FIGS. 9 through 12. In some examples, a device may execute a set of instructions to control the functional elements of the device to perform the functions described below. Additionally, or alternatively, a device may perform aspects of the functions described below using special-purpose hardware.

At 1305, the device may initiate a handover interval including one or more extended synchronous connection-oriented (eSCO) windows. The operations of 1305 may be performed according to the methods described herein. In some examples, aspects of the operations of 1305 may be performed by a handover interval manager as described with reference to FIGS. 9 through 12.

At 1310, the device may buffer a set of one or more audio (e.g., microphone) data packets during the handover interval. The operations of 1310 may be performed according to the methods described herein. In some examples, aspects of the operations of 1310 may be performed by a buffering manager as described with reference to FIGS. 9 through 12.

At 1315, the device may discard at least a portion of the set of one or more audio data packets during the handover interval. The operations of 1315 may be performed according to the methods described herein. In some examples, aspects of the operations of 1315 may be performed by a buffering manager as described with reference to FIGS. 9 through 12.

At 1320, the device may receive, during an extended retransmission portion of a first eSCO window of the handover interval, a handover indication from a second wireless audio device. The operations of 1320 may be performed according to the methods described herein. In some examples, aspects of the operations of 1320 may be performed by a handover indication manager as described with reference to FIGS. 9 through 12.

At 1325, the device may transmit, to a host device based on the handover indication, one or more audio data packets during a second eSCO window that is subsequent to the handover interval. The operations of 1325 may be performed according to the methods described herein. In some examples, aspects of the operations of 1325 may be performed by a handover interval manager as described with reference to FIGS. 9 through 12.

Figure 14:
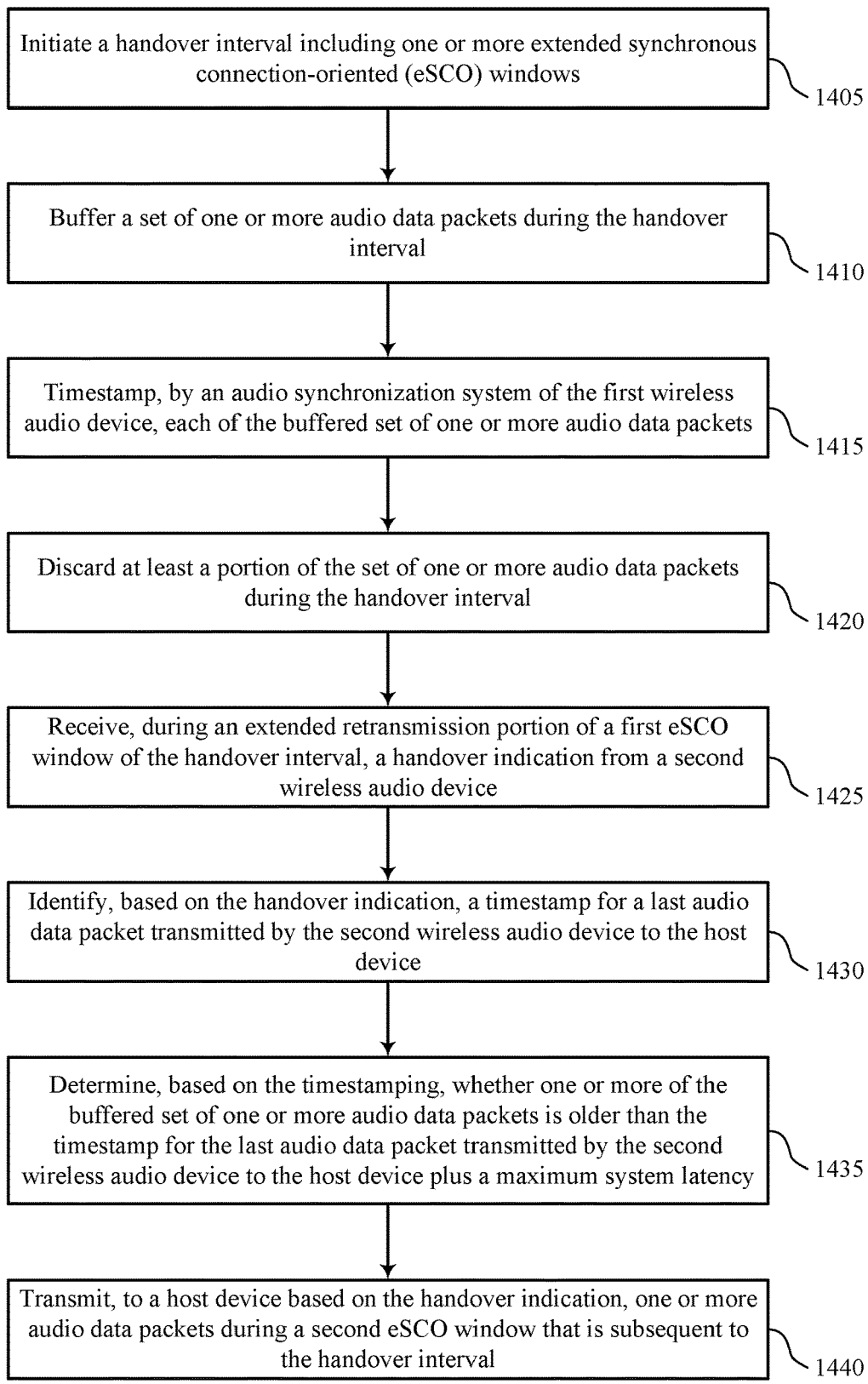

FIG. 14 shows a flowchart illustrating a method 1400 that supports audio synchronization during handover in accordance with aspects of the present disclosure. The operations of method 1400 may be implemented by a device or its components as described herein. For example, the operations of method 1400 may be performed by a communications manager as described with reference to FIGS. 9 through 12. In some examples, a device may execute a set of instructions to control the functional elements of the device to perform the functions described below. Additionally, or alternatively, a device may perform aspects of the functions described below using special-purpose hardware.

At 1405, the device may initiate a handover interval including one or more extended synchronous connection-oriented (eSCO) windows. The operations of 1405 may be performed according to the methods described herein. In some examples, aspects of the operations of 1405 may be performed by a handover interval manager as described with reference to FIGS. 9 through 12.

At 1410, the device may buffer a set of one or more audio (e.g., microphone) data packets during the handover interval. The operations of 1410 may be performed according to the methods described herein. In some examples, aspects of the operations of 1410 may be performed by a buffering manager as described with reference to FIGS. 9 through 12.

At 1415, the device may timestamp, by an audio synchronization system of the first wireless audio device, each of the buffered set of one or more audio data packets. The operations of 1415 may be performed according to the methods described herein. In some examples, aspects of the operations of 1415 may be performed by a timestamp manager as described with reference to FIGS. 9 through 12.

At 1420, the device may discard at least a portion of the set of one or more audio data packets during the handover interval. The operations of 1420 may be performed according to the methods described herein. In some examples, aspects of the operations of 1420 may be performed by a buffering manager as described with reference to FIGS. 9 through 12.

At 1425, the device may receive, during an extended retransmission portion of a first eSCO window of the handover interval, a handover indication from a second wireless audio device. The operations of 1425 may be performed according to the methods described herein. In some examples, aspects of the operations of 1425 may be performed by a handover indication manager as described with reference to FIGS. 9 through 12.

At 1430, the device may identify, based on the handover indication, a timestamp for a last audio data packet transmitted by the second wireless audio device to the host device. The operations of 1430 may be performed according to the methods described herein. In some examples, aspects of the operations of 1430 may be performed by a timestamp manager as described with reference to FIGS. 9 through 12.

At 1435, the device may determine, based on the timestamping, whether one or more of the buffered set of one or more audio data packets is older than the timestamp for the last audio data packet transmitted by the second wireless audio device to the host device plus a maximum system latency. The operations of 1435 may be performed according to the methods described herein. In some examples, aspects of the operations of 1435 may be performed by a timestamp manager as described with reference to FIGS. 9 through 12.

At 1440, the device may transmit, to a host device based on the handover indication, one or more audio data packets during a second eSCO window that is subsequent to the handover interval. The operations of 1440 may be performed according to the methods described herein. In some examples, aspects of the operations of 1440 may be performed by a handover interval manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first wireless audio device, comprising:
   identifying, based at least in part on communicating with a second wireless audio device, a link quality between the second wireless audio device and a host device;
   initiating, based at least in part on the identified link quality, a handover interval comprising one or more extended synchronous connection-oriented (eSCO) windows;
   buffering a set of one or more audio data packets during the handover interval based at least in part on the initiating;
   discarding at least a first portion of the set of one or more audio data packets during the handover interval based at least in part on determining that the first portion of the set of one or more audio data packets has been transmitted to the host device by the second wireless audio device;
   receiving, during an extended retransmission portion of a first eSCO window of the handover interval, a handover indication from the second wireless audio device; and
   transmitting, to the host device based at least in part on the handover indication, at least a second portion of the set of one or more audio data packets during a second eSCO window that is subsequent to the handover interval.

2. The method of claim 1, further comprising:
   transmitting, based at least in part on receiving the handover indication, a handover indication response to the second wireless audio device during the extended retransmission portion of the first eSCO window, wherein transmitting the one or more audio data packets during the second eSCO window is based at least in part on the handover indication response.

3. The method of claim 1, further comprising:
   enabling microphone data for the first wireless audio device, based at least in part on initiating the handover interval, wherein buffering the set of one or more audio data packets is based at least in part on enabling the microphone data.

4. The method of claim 1, wherein the communicating is performed over an eSCO link between the first wireless audio device and the second wireless audio device.

5. The method of claim 1, further comprising:
   timestamping, by an audio synchronization system of the first wireless audio device, each of the buffered set of one or more audio data packets;
   identifying, based at least in part on the handover indication, a timestamp for a last audio data packet transmitted by the second wireless audio device to the host device; and
   determining, based at least in part on the timestamping, whether one or more of the buffered set of one or more audio data packets is older than the timestamp for the last audio data packet transmitted by the second wireless audio device to the host device plus a maximum system latency.

6. The method of claim 5, further comprising:
   upon determining that one or more of the buffered set of one or more audio data packets is older than the timestamp for the last audio data packet transmitted by the second wireless audio device to the host device plus a maximum system latency, discarding the one or more of the buffered set of one or more audio data packets.

7. The method of claim 1, further comprising:
   monitoring, based at least in part on initiating the handover interval, for the handover indication during the extended retransmission portion of the first eSCO window of the handover interval, wherein receiving the handover indication is based at least in part on the monitoring.

8. The method of claim 1, further comprising:
   reverting to a default eSCO window duration that does not include an extended retransmission portion upon terminating the handover interval, wherein the default eSCO window duration is shorter than a duration of the one or more eSCO windows included in the handover interval.

9. The method of claim 1, wherein the second eSCO window is consecutive to the first eSCO window.

10. The method of claim 1, wherein the one or more audio data packets comprise one or more microphone data packets.

11. An apparatus for wireless communications at a first wireless audio device, comprising:
 a processor,
 memory in electronic communication with the processor; and
 instructions stored in the memory and executable by the processor to cause the apparatus to:
  identify, based at least in part on communicating with a second wireless audio device, a link quality between the second wireless audio device and a host device;
  initiate, based at least in part on the identified link quality, a handover interval comprising one or more extended synchronous connection-oriented (eSCO) windows;
  buffer a set of one or more audio data packets during the handover interval based at least in part on the initiating;
  discard at least a first portion of the set of one or more audio data packets during the handover interval based at least in part on determining that the first portion of the set of one or more audio data packets has been transmitted to the host device by the second wireless audio device;
  receive, during an extended retransmission portion of a first eSCO window of the handover interval, a handover indication from the second wireless audio device; and
  transmit, to the host device based at least in part on the handover indication, at least a second portion of the set of one or more audio data packets during a second eSCO window that is subsequent to the handover interval.

12. The apparatus of claim 11, wherein the instructions are further executable by the processor to cause the apparatus to:
 transmit, based at least in part on receiving the handover indication, a handover indication response to the second wireless audio device during the extended retransmission portion of the first eSCO window, wherein transmitting the one or more audio data packets during the second eSCO window is based at least in part on the handover indication response.

13. The apparatus of claim 11, wherein the instructions are further executable by the processor to cause the apparatus to:
 enable microphone data for the first wireless audio device, based at least in part on initiating the handover interval, wherein buffering the set of one or more audio data packets is based at least in part on enabling the microphone data.

14. The apparatus of claim 11, wherein the instructions are further executable by the processor to cause the apparatus to:
 timestamp, by an audio synchronization system of the first wireless audio device, each of the buffered set of one or more audio data packets;
 identify, based at least in part on the handover indication, a timestamp for a last audio data packet transmitted by the second wireless audio device to the host device; and
 determine, based at least in part on the timestamping, whether one or more of the buffered set of one or more audio data packets is older than the timestamp for the last audio data packet transmitted by the second wireless audio device to the host device plus a maximum system latency.

15. The apparatus of claim 14, wherein the instructions are further executable by the processor to cause the apparatus to:
 upon determining that one or more of the buffered set of one or more audio data packets is older than the timestamp for the last audio data packet transmitted by the second wireless audio device to the host device plus a maximum system latency, discarding the one or more of the buffered set of one or more audio data packets.

16. The apparatus of claim 11, wherein the instructions are further executable by the processor to cause the apparatus to:
 monitor, based at least in part on initiating the handover interval, for the handover indication during the extended retransmission portion of the first eSCO window of the handover interval, wherein receiving the handover indication is based at least in part on the monitoring.

17. The apparatus of claim 11, wherein the instructions are further executable by the processor to cause the apparatus to:
 revert to a default eSCO window duration that does not include an extended retransmission portion upon terminating the handover interval, wherein the default eSCO window duration is shorter than a duration of the one or more eSCO windows included in the handover interval.

18. A non-transitory computer-readable medium storing code for wireless communications at a first wireless audio device, the code comprising instructions executable by a processor to:
 identify, based at least in part on communicating with a second wireless audio device, a link quality between the second wireless audio device and a host device;
 initiate, based at least in part on the identified link quality, a handover interval comprising one or more extended synchronous connection-oriented (eSCO) windows;
 buffer a set of one or more audio data packets during the handover interval based at least in part on the initiating;
 discard at least a first portion of the set of one or more audio data packets during the handover interval based at least in part on determining that the first portion of the set of one or more audio data packets has been transmitted to the host device by the second wireless audio device;
 receive, during an extended retransmission portion of a first eSCO window of the handover interval, a handover indication from the second wireless audio device; and
 transmit, to the host device based at least in part on the handover indication, at least a second portion of the set of one or more audio data packets during a second eSCO window that is subsequent to the handover interval.

* * * * *